(12) United States Patent
Nakada

(10) Patent No.: US 8,219,881 B2
(45) Date of Patent: Jul. 10, 2012

(54) MEMORY CONTROLLING METHOD, PROGRAM AND DEVICE

(75) Inventor: Kosaku Nakada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1090 days.

(21) Appl. No.: 12/052,846

(22) Filed: Mar. 21, 2008

(65) Prior Publication Data

US 2008/0189493 A1 Aug. 7, 2008

Related U.S. Application Data

(63) Continuation of application No. PCT/JP2005/024053, filed on Dec. 28, 2005.

(51) Int. Cl.
*G11C 29/00* (2006.01)
*G06F 11/00* (2006.01)
(52) U.S. Cl. .............................. 714/763; 714/42; 714/54
(58) Field of Classification Search .................... 714/42, 714/54
See application file for complete search history.

(56) References Cited

U.S. PATENT DOCUMENTS

| 4,736,293 | A | * | 4/1988 | Patrick ........................... 711/128 |
| 5,333,289 | A | | 7/1994 | Kaneko et al. |
| 5,367,653 | A | * | 11/1994 | Coyle et al. .................... 711/128 |
| 5,524,231 | A | | 6/1996 | Brown |
| 5,684,973 | A | | 11/1997 | Sullivan et al. |
| 6,748,480 | B2 | * | 6/2004 | Chudnovsky et al. ............. 711/5 |
| 7,486,537 | B2 | * | 2/2009 | Scheuerlein et al. ......... 365/148 |
| 2002/0133664 | A1 | * | 9/2002 | Endo ................................ 711/3 |
| 2003/0167383 | A1 | * | 9/2003 | Gupta et al. .................... 711/157 |
| 2005/0144516 | A1 | * | 6/2005 | Gonzalez et al. ................. 714/8 |

FOREIGN PATENT DOCUMENTS

| EP | 1 152 339 A2 | 11/2001 |
| JP | 55-32188 | 3/1980 |
| JP | 55-52600 | 4/1980 |
| JP | 2-166543 | 6/1990 |
| JP | 4-145557 | 5/1992 |
| JP | 4-165548 | 6/1992 |
| JP | 11-312120 | 11/1999 |

OTHER PUBLICATIONS

International Search Report (PCT/ISA/210) mailed Dec. 28, 2005 in connection with the International Application PCT/JP2005/024053.
Cheung K C et al., "Design and Analysis of a Gracefully Degrading Interleaved Memory System", IEEE Transactions on Computers, IEEE Service Center, Los Alamitos, CA, US, vol. 39, No. 1, Jan. 1, 1990, pp. 63-71.
European Search Report mailed Sep. 22, 2009 and issued in corresponding European Patent Application 05822500.4.

* cited by examiner

*Primary Examiner* — Robert Beausoliel, Jr.
*Assistant Examiner* — Neil Miles
(74) *Attorney, Agent, or Firm* — Staas & Halsey LLP

(57) ABSTRACT

An interleave control which accesses a plurality of memory elements. A logical address is converted into a real address composed of a memory element selection address and a memory element address. The logical address of a CPU that has a logical address space divided into N area is converted into the real address decided in a way number W, and the memory elements are accessed by the interleave control. A real address area utilization information is prepared that is common to all the way numbers by dividing the real address space formed of a plurality of memory elements into areas (N×Wmax) based upon multiplying the area number N of the logical address space and the maximum way number Wmax, and utilization prohibition information is recorded in the area including the abnormal portion of the real address area utilization information when the abnormality of the memory element is detected.

16 Claims, 32 Drawing Sheets

FIG. 4

| MEMORY SELECTION | | MEMORY ADDRESS | | | | | | | | ADDRESS DECIMAL VIEW | |
|---|---|---|---|---|---|---|---|---|---|---|---|
| C9 | C8 | C7 | C6 | C5 | C4 | C3 | C2 | C1 | C0 | | |
| B1 | B0 | A7 | A6 | A5 | A4 | A3 | A2 | A1 | A0 | | |
| 0 | 0 | 0 | 0 | 0 | 0 | 0 | 0 | 0 | 0 | 0 | |
| 0 | 0 | 0 | 0 | 0 | 0 | 0 | 0 | 0 | 1 | 1 | |
| 0 | 0 | 0 | 0 | 0 | 0 | 0 | 0 | 1 | 0 | 2 | |
| 0 | 0 | 0 | 0 | 0 | 0 | 0 | 0 | 1 | 1 | 3 | |
| 0 | 0 | 0 | 0 | 0 | 0 | 0 | 1 | 0 | 0 | 4 | 14-1 |
| 0 | 0 | 0 | 0 | 0 | 0 | 0 | 1 | 0 | 1 | 5 | |
| ⋮ | ⋮ | | | | ⋮ | | | | | ⋮ | |
| 0 | 0 | 1 | 1 | 1 | 1 | 1 | 1 | 1 | 0 | 254 | |
| 0 | 0 | 1 | 1 | 1 | 1 | 1 | 1 | 1 | 1 | 255 | |
| 0 | 1 | 0 | 0 | 0 | 0 | 0 | 0 | 0 | 0 | 1 | |
| 0 | 1 | 0 | 0 | 0 | 0 | 0 | 0 | 0 | 1 | 2 | |
| ⋮ | ⋮ | | | | ⋮ | | | | | ⋮ | 14-2 |
| 0 | 0 | 1 | 1 | 1 | 1 | 1 | 1 | 1 | 0 | 254 | |
| 0 | 1 | 1 | 1 | 1 | 1 | 1 | 1 | 1 | 1 | 255 | |
| 1 | 0 | 0 | 0 | 0 | 0 | 0 | 0 | 0 | 0 | 1 | |
| 1 | 0 | 0 | 0 | 0 | 0 | 0 | 0 | 0 | 1 | 2 | |
| ⋮ | ⋮ | | | | ⋮ | | | | | ⋮ | 14-3 |
| 1 | 0 | 1 | 1 | 1 | 1 | 1 | 1 | 1 | 0 | 254 | |
| 1 | 0 | 1 | 1 | 1 | 1 | 1 | 1 | 1 | 1 | 255 | |
| 1 | 1 | 0 | 0 | 0 | 0 | 0 | 0 | 0 | 0 | 1 | |
| 1 | 1 | 0 | 0 | 0 | 0 | 0 | 0 | 0 | 1 | 2 | |
| ⋮ | ⋮ | | | | ⋮ | | | | | ⋮ | 14-4 |
| 1 | 1 | 1 | 1 | 1 | 1 | 1 | 1 | 1 | 0 | 254 | |
| 1 | 1 | 1 | 1 | 1 | 1 | 1 | 1 | 1 | 1 | 255 | |

38-1

40 MALFUNCTION

| MEMORY SELECTION | | MEMORY ADDRESS | | | | | | | | | ADDRESS DECIMAL VIEW |
|---|---|---|---|---|---|---|---|---|---|---|---|
| C9 B1 | C0 B0 | C7 A7 | C6 A6 | C5 A5 | C4 A4 | C3 A3 | C2 A2 | C1 A1 | C8 A0 | | |
| 0 | 0 | 0 | 0 | 0 | 0 | 0 | 0 | 0 | 0 | | 0 |
| 0 | 1 | 0 | 0 | 0 | 0 | 0 | 0 | 0 | 0 | | 0 |
| 0 | 0 | 0 | 0 | 0 | 0 | 0 | 0 | 1 | 0 | | 2 |
| 0 | 1 | 0 | 0 | 0 | 0 | 0 | 0 | 1 | 0 | | 2 |
| 0 | 0 | 0 | 0 | 0 | 0 | 0 | 1 | 0 | 0 | | 4 |
| 0 | 1 | 0 | 0 | 0 | 0 | 0 | 1 | 0 | 0 | | 4 |
| ... | | | | | | | | | | | ... |
| 0 | 0 | 1 | 1 | 1 | 1 | 1 | 1 | 1 | 0 | | 254 |
| 0 | 1 | 1 | 1 | 1 | 1 | 1 | 1 | 1 | 0 | | 254 |
| 0 | 0 | 0 | 0 | 0 | 0 | 0 | 0 | 0 | 1 | | 1 |
| 0 | 1 | 0 | 0 | 0 | 0 | 0 | 0 | 0 | 1 | | 1 |
| 0 | 0 | 0 | 0 | 0 | 0 | 0 | 0 | 1 | 1 | | 3 |
| 0 | 1 | 0 | 0 | 0 | 0 | 0 | 0 | 1 | 1 | | 3 |
| 0 | 0 | 0 | 0 | 0 | 0 | 0 | 1 | 0 | 1 | | 5 |
| 0 | 1 | 0 | 0 | 0 | 0 | 0 | 1 | 0 | 1 | | 5 |
| ... | | | | | | | | | | | ... |
| 0 | 0 | 1 | 1 | 1 | 1 | 1 | 1 | 1 | 1 | | 253 |
| 0 | 0 | 1 | 1 | 1 | 1 | 1 | 1 | 1 | 1 | | 255 |
| 0 | 1 | 1 | 1 | 1 | 1 | 1 | 1 | 1 | 1 | | 255 |

38-2

58-1 EVEN-NUMBERED ADDRESS AREA (C8=0)

58-2 ODD-NUMBERED ADDRESS AREA (C8=1)

40 MALFUNCTION

FIG. 9

| NUMBER OF DIVIDED AREA N OF GPU ADDRESS SPACE | NUMBER OF WAY W OF INTERLEAVE | NUMBER OF DIVIDED AREA M OF ACTUAL ADDRESS SPACE (=N×Wmax) | | ADDRESS |
|---|---|---|---|---|
| 8 | 1 | 8 | CPU | C9 C8 C7 C6 C5 C4 C3 C2 C1 C0 |
| | | | MEMORY | B1 B0 A7 A6 A5 A4 A3 A2 A1 A0 |
| | 2 | 16 | CPU | C9 C8 C7 C6 C5 C4 C3 C2 C1 C0 |
| | | | MEMORY | B1 A0 A7 A6 A5 A4 A3 A2 A1 B0 |
| | 4 | 32 | CPU | C9 C8 C7 C6 C5 C4 C3 C2 C1 C0 |
| | | | MEMORY | A1 A0 A7 A6 A5 A4 A3 A2 B1 B0 |

FIG. 10C

| | (X) | (Y) | (Z) | | 50-1 |
|---|---|---|---|---|---|
| 52 { | CPU ADDRESS | | | | |
| | C9 | C8 | C7 | | |
| 54 { | MEMORY ADDRESS | | | UTILIZATION FLAG | CPU AREA |
| | B1 | B0 | A7 | | |
| | 0 | 0 | 0 | ○ | #0 |
| | 0 | 0 | 1 | × | #1 |
| | 0 | 1 | 0 | ○ | #2 |
| | 0 | 1 | 1 | ○ | #3 |
| | 1 | 0 | 0 | ○ | #4 |
| | 1 | 0 | 1 | ○ | #5 |
| | 1 | 1 | 0 | ○ | #6 |
| | 1 | 1 | 1 | ○ | #7 |

FIG. 11C

| (X) | (Y) | (Z) | | |
|---|---|---|---|---|
| CPU ADDRESS | | | UTILIZATION FLAG | CPU AREA |
| C9 | C8 | C7 | | |
| MEMORY ADDRESS | | | | |
| B1 | A0 | A7 | | |
| 0 | 0 | 0 | ○ | #0 |
| 0 | 0 | 1 | ○ | #1 |
| 0 | 1 | 0 | ○ | #2 |
| 0 | 1 | 1 | × | #3 |
| 1 | 0 | 0 | ○ | #4 |
| 1 | 0 | 1 | ○ | #5 |
| 1 | 1 | 0 | ○ | #6 |
| 1 | 1 | 1 | ○ | #7 |

52 { (rows 1–2)
54 { (rows 3–4)
50-2

FIG. 17

| MEMORY SELECTION | | MEMORY ADDRESS | | | | | | | | ADDRESS DECIMAL VIEW |
|---|---|---|---|---|---|---|---|---|---|---|
| C1 | C0 | C7 | C6 | C5 | C4 | C3 | C2 | C9 | C8 | |
| B1 | B0 | A7 | A6 | A5 | A4 | A3 | A2 | A1 | A0 | |
| 0 | 0 | 0 | 0 | 0 | 0 | 0 | 0 | 0 | 0 | 0 |
| 0 | 1 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 1 | 0 | 0 | 0 | 0 | 0 | 0 | 0 | 0 | 0 |
| 0 | 0 | 0 | 0 | 0 | 0 | 0 | 1 | 0 | 0 | 4 |
| 0 | 1 | 0 | 0 | 0 | 0 | 0 | 1 | 0 | 0 | 4 |
| 1 | 0 | 0 | 0 | 0 | 0 | 0 | 1 | 0 | 0 | 4 |
| 1 | 1 | 0 | 0 | 0 | 0 | 0 | 1 | 0 | 0 | 4 |
| 0 | 0 | 0 | 0 | 0 | 0 | 1 | 0 | 0 | 0 | 8 |
| 0 | 1 | 0 | 0 | 0 | 0 | 1 | 0 | 0 | 0 | 8 |
| 1 | 0 | 0 | 0 | 0 | 0 | 1 | 0 | 0 | 0 | 8 |
| 1 | 1 | 0 | 0 | 0 | 0 | 1 | 0 | 0 | 0 | 8 |
| ⋮ | | ⋮ | | | | | | | | ⋮ |
| 0 | 0 | 1 | 1 | 1 | 1 | 1 | 1 | 0 | 0 | 252 |
| 0 | 1 | 1 | 1 | 1 | 1 | 1 | 1 | 0 | 0 | 252 |
| 1 | 0 | 1 | 1 | 1 | 1 | 1 | 1 | 0 | 0 | 252 |
| 1 | 1 | 1 | 1 | 1 | 1 | 1 | 1 | 0 | 0 | 252 |
| 0 | 0 | 0 | 0 | 0 | 0 | 0 | 0 | 0 | 1 | 1 |
| 0 | 1 | 0 | 0 | 0 | 0 | 0 | 0 | 0 | 1 | 1 |
| 1 | 0 | 0 | 0 | 0 | 0 | 0 | 0 | 0 | 1 | 1 |
| 1 | 1 | 0 | 0 | 0 | 0 | 0 | 0 | 0 | 1 | 1 |
| 0 | 0 | 0 | 0 | 0 | 0 | 0 | 1 | 0 | 1 | 5 |
| 0 | 1 | 0 | 0 | 0 | 0 | 0 | 1 | 0 | 1 | 5 |
| 1 | 0 | 0 | 0 | 0 | 0 | 0 | 1 | 0 | 1 | 5 |
| 1 | 1 | 0 | 0 | 0 | 0 | 0 | 1 | 0 | 1 | 5 |
| ⋮ | | ⋮ | | | | | | | | ⋮ |
| 0 | 0 | 1 | 1 | 1 | 1 | 1 | 1 | 0 | 1 | 253 |
| 0 | 1 | 1 | 1 | 1 | 1 | 1 | 1 | 0 | 1 | 253 |
| 1 | 0 | 1 | 1 | 1 | 1 | 1 | 1 | 0 | 1 | 253 |
| 1 | 1 | 1 | 1 | 1 | 1 | 1 | 1 | 0 | 1 | 253 |

38-3

64-1 FIRST ADDRESS AREA C9C8=00

64-2 SECOND ADDRESS AREA C9C8=01

FIG. 18

| | | | | | | | | | | | |
|---|---|---|---|---|---|---|---|---|---|---|---|
| 0 | 0 | 0 | 0 | 0 | 0 | 0 | 0 | 1 | 0 | 2 | |
| 0 | 1 | 0 | 0 | 0 | 0 | 0 | 0 | 1 | 0 | 2 | |
| 1 | 0 | 0 | 0 | 0 | 0 | 0 | 0 | 1 | 0 | 2 | |
| 1 | 1 | 0 | 0 | 0 | 0 | 0 | 1 | 1 | 0 | 2 | |
| 0 | 0 | 0 | 0 | 0 | 0 | 0 | 1 | 1 | 0 | 6 | 64-3 |
| 0 | 1 | 0 | 0 | 0 | 0 | 0 | 1 | 1 | 0 | 6 | THIRD ADDRESS AREA C9C8=10 |
| 1 | 0 | 0 | 0 | 0 | 0 | 0 | 1 | 1 | 0 | 6 | |
| 1 | 1 | 0 | 0 | 0 | 0 | 0 | 1 | 1 | 0 | 6 | |
| ⋮ | | | ⋮ | | | | | | | ⋮ | |
| 0 | 0 | 1 | 1 | 1 | 1 | 1 | 1 | 1 | 0 | 254 | |
| 0 | 1 | 1 | 1 | 1 | 1 | 1 | 1 | 1 | 0 | 254 | |
| 1 | 0 | 1 | 1 | 1 | 1 | 1 | 1 | 1 | 0 | 254 | |
| 1 | 1 | 1 | 1 | 1 | 1 | 1 | 1 | 1 | 0 | 254 | |
| 0 | 0 | 0 | 0 | 0 | 0 | 0 | 0 | 1 | 1 | 3 | |
| 0 | 1 | 0 | 0 | 0 | 0 | 0 | 0 | 1 | 1 | 3 | |
| 1 | 0 | 0 | 0 | 0 | 0 | 0 | 0 | 1 | 1 | 3 | |
| 1 | 1 | 0 | 0 | 0 | 0 | 0 | 1 | 1 | 1 | 3 | |
| 0 | 0 | 0 | 0 | 0 | 0 | 0 | 1 | 1 | 1 | 7 | 64-4 |
| 0 | 1 | 0 | 0 | 0 | 0 | 0 | 1 | 1 | 1 | 7 | FOURTH ADDRESS AREA C9C8=11 |
| 1 | 0 | 0 | 0 | 0 | 0 | 0 | 1 | 1 | 1 | 7 | |
| 1 | 1 | 0 | 0 | 0 | 0 | 0 | 1 | 1 | 1 | 7 | |
| ⋮ | | | ⋮ | | | | | | | ⋮ | |
| 0 | 0 | 1 | 1 | 1 | 1 | 1 | 1 | 1 | 1 | 255 | ← |
| 0 | 1 | 1 | 1 | 1 | 1 | 1 | 1 | 1 | 1 | 255 | |
| 1 | 0 | 1 | 1 | 1 | 1 | 1 | 1 | 1 | 1 | 255 | |
| 1 | 1 | 1 | 1 | 1 | 1 | 1 | 1 | 1 | 1 | 255 | |

MALFUNCTION
40

FIG. 22A

| 70-3 | | | | | |
|---|---|---|---|---|---|
| 0/1 | 0/1 | Z | X | Y | ? |

FIG. 23

| (X) | (Y) | (Z) | | |
|---|---|---|---|---|
| CPU ADDRESS | | | | 50-3 |
| C9 | C8 | C7 | | |
| MEMORY ELEMENT ADDRESS | | | UTILIZATION FLAG | CPU AREA |
| A1 | A0 | A7 | | |
| 0 | 0 | 0 | ○ | #0 |
| 0 | 0 | 1 | ○ | #1 |
| 0 | 1 | 0 | ○ | #2 |
| 0 | 1 | 1 | ○ | #3 |
| 1 | 0 | 0 | ○ | #4 |
| 1 | 0 | 1 | ○ | #5 |
| 1 | 1 | 0 | ○ | #6 |
| 1 | 1 | 1 | × | #7 |

74 { (rows: CPU ADDRESS, C9/C8/C7)
76 { (rows: MEMORY ELEMENT ADDRESS, A1/A0/A7)

MEMORY CONTROLLING METHOD, PROGRAM AND DEVICE

This application is a continuation of PCT/JP2005/024053 filed Dec. 28, 2005.

TECHNICAL FIELD

The present invention relates to a memory control method, a program, and a device for accessing a memory formed of a plurality of memory modules, and in particular, it relates to a memory control method, a program and a device for setting an utilization prohibition area in an address space of a CPU based on the abnormal portion of the memory module.

BACKGROUND ART

Heretofore, in a memory device such as a main memory used for a computer system of a multi-CPU configuration, a plurality of memory modules (referred to also as memory bank) serving as memory elements independently accessible are mounted on a board, thereby constructing a memory device, and a memory module used for such memory device is unable to avoid a fluctuation of the quality caused by the production process of the memory module. Due to the fluctuation of the quality caused by the production of this memory module, there are often the cases where abnormality occurs in which normal reading and wiring are unable to be performed in a part of the address, while being mounted and used in the memory device. When the memory abnormality is detected, it is important that the memory module causing the memory abnormality is specified and the abnormal portion is eliminated from the system, thereby to stably operate the system. With respect to the memory module once recognized as abnormal, even if the memory configuration is changed by a change of the number of ways of interleave control, until the abnormal memory module is exchanged, it is required not to be incorporated into the system for the sake of the improvement of the robustness in the operational system, the malfunction maintenance work time when malfunction occurs after starting the operation, and saving in the cost for maintenance. Hence, in the conventional memory device, when the memory abnormality is detected by the hardware function of the memory controller, the memory module causing the memory abnormality is specified, and the abnormal part is eliminated from the system. That is, the memory controller divides the address space of the memory module seen from the CPU into the areas of an appropriate size, and when the abnormality of the memory module is detected, a memory control of degenerating a memory is performed such that the area corresponding to the abnormal portion is set as an utilization prohibition area, and the area including the abnormal portion are not incorporated into an utilizable area by the CPU.

Patent Document 1: JP-A-02-166543
Patent Document 2: JP-A-04-165548

However, in the conventional memory control, since the function degenerating so as to specify a memory module causing memory abnormality not to be incorporated into the system has been mounted by the hardware function, the increase in the cost and the size due to the increase of a mounted circuit has become a problem. Further, in the conventional memory control method for dividing the address space of the memory module visible from the CPU into the areas of an appropriate size and managing the areas utilizable by the CPU, no measures can be taken when the memory configuration is changed by the change of the number of ways in the interleave control.

For example, when the number of ways of the interleave control is changed from a 1-way (no interleave) to a 2-way memory configuration, a corresponding relationship between the real address of the memory module and a logic address visible from the CPU is also changed, and for example, while the address of the abnormal location before the change of the memory configuration corresponds to an m-th area, after the change of the memory configuration, a situation may develop where the address of the abnormal portion comes to correspond to another n-th area. Hence, the problem is that, after changing the memory configuration, the abnormal portion of the memory module is specified again, and with respect to the divided areas of the address space visible from the CPU after the change of the configuration, the area corresponding to the abnormal portion of the memory module is determined and set as an area for utilization prohibition, and area management for not incorporating the area including the abnormal portion into the utilizable area of the CPU is required, and area utilization information before the change of the configuration is unable to be taken over after the change of the configuration, and a process load for deciding the area utilizable by the CPU after the memory re-configuration is increased, and re-starting the process after the change of the memory configuration takes time.

DISCLOSURE OF THE INVENTION

According to the present invention, a memory control device, a method and a program are provided, which are capable of taking over use information of the area having divided the memory address space seen from the CPU when a memory configuration is changed and simply and promptly setting area use information after the change of the memory configuration.

(Method)

The present invention provides a memory control method. That is, the present invention is a memory control method for converting a logic address into a real address, thereby to access a memory, comprising the steps of:

recording utilization prohibition information in the area corresponding to the memory in which abnormality is detected in a real address area utilization table recorded with utilizable information on the real address space of the memory when the abnormality of the memory is detected; and generating a logic address area utilization table recorded with utilizable information or utilization prohibition information on each area in the logic address space from the real address area utilization table.

The present invention provides a memory control method. That is, the present invention is a memory control method for converting a logic address from the CPU into a real address formed of an element selection address and a memory element address, thereby to access a plurality of memory elements, comprising:

an interleave control step of converting a logic address of the CPU utilizing the logic address space divided into N area into the real address decided by a way number W, thereby to access a plurality of memory elements by an interleave control, and capable of re-configuring the memory configuration by the designation of a different way number W;

a real address area management step of dividing a real address space formed of a plurality of memory elements into areas (N×Wmax) by multiplying the area number N of the CPU logic address space by the maximum way number Wmax of the interleave control, and preparing a real address area utilization table common to all way numbers recorded with the utilizable information, and recording utilization prohibition information in the area including the abnormal portion of the real address area utilization table when the abnormality of the memory element is detected; and a logic address area management step of generating a logic address area utilization table recorded with utilizable information or utilization prohibition information in each area in the logic address space from the real address area utilization table by corresponding to the memory configuration decided by the way number W of the interleave control step and deciding an area of the logic address space utilized by the CPU.

Here, the interleave control step re-configures the memory configuration by the designation of any of different way number W, which is a power of two.

[1-2-Way Changeover]

When the interleave control step is capable of performing the memory re-configuration by the designation of the way number 1 or 2, the memory control method is provided, wherein the real address management step (in parentheses, for example, show the case where the CPU address is 10 bits, the memory element address is 8 bits of A7 to A0, and the element selection address is 2 bits of B1 to B0) generates a real address area utilization table recorded with utilization permitting information or utilization prohibition information in each area divided by multiplying (N×2) the area number N of the CPU logic address space by the maximum way number 2 of the interleave control by 4 bit addresses (B1, B0, A7, and A0) of the low order 2 bits (B1 and B0) of the element selection address, the most significant bit (A7) of the real address, and the least significant bit (A0) of the real address; and wherein the logic address area management step, in the case of the memory configuration where the interleave control step is decided by the 1-way, prepares a 1-way logic address area utilization table recorded with utilization permitting information or utilization prohibition information in each area N-divided by 3-bit addresses (B1, B0, and A7) of the low order 2 bits (B1 and B0) of the element selection address and the most significant bit (A7) of the real address of the real address area utilization table, and decides an area of the logic address space utilized by the CPU, and further, wherein the logic address area management step, in the case of the memory configuration where the interleave control step is decided by a 2-way, prepares a 2-way logic address area utilization table recorded with utilization permitting information or utilization prohibition information in each area N-divided by 3-bit addresses (B1, A0, A7) of the low order second 2 bit (B1) of the element section address, the least significant bit (A0) of the real address, and the most significant bit (A7) of the real address of the real address area utilization table, and decides an area of the logic address space utilized by the CPU.

(1-2-4 Way Changeover)

When the interleave control step can re-configure the memory by the designation of the way numbers 1, 2 or 4, the real address management step (in parentheses, for example, show the case where the CPU address is 10 bits, the memory element address is 8 bits of A7 to A0, and the element selection address is 2 bits of B1 to B0) generates a real address area utilization table recorded with utilization permitting information or utilization prohibition information in each area divided by multiplying (N×4) the area number N of the CPU logic address space by the maximum way number 4 of the interleave control by 5 bit addresses (B1, B0, A7, A1 and A0) of the low order 2 bits (B1 and B0) of the element selection address,
the most significant bit (A7) of the real address, and
the least significant 2 bits (A1 and A0) of the real address, and
the logic address area management step, in the case of the memory configuration where the interleave control step is decided by 1-way, prepares a 1-way logic address area utilization table recorded with utilization permitting information or utilization prohibition information in each area N-divided by 3-bit addresses (B1, B0, and A7) of
the low order 2 bit (B1 and B0) of the element selection address,
and the most significant bit (A7) of the real address of the real address area utilization table, and decides an divided area of the logic address space utilized by the CPU; and further, the logic address area management step, in the case of the memory configuration where the interleave control step is decided by 2-way, prepares a 2-way logic address area utilization table recorded with utilization permitting information or utilization prohibition information in each area N-divided by 3 bit addresses (B1, A0, and A7) of
the low order 2 bits (B1) of the element selection address,
the least significant bit (A0) of the real address, and
the most significant bit (A7) of the real address of the real address area utilization table, and decides a divided area of the logic address space utilized by the CPU, and further, the logic address area management steps, in the case of the memory configuration where the interleave control step is decided by 4-way, prepares a 4 way logic address area utilization table recorded with utilization permitting information or utilization prohibition information in each area N-divided by 3-bit addresses (A1, A0, and A7) of the low order 2 bits (A1 and A0) of the real address, and
the most significant bit (A7) of the real address of the real address area utilization table, and decides a divided area of the logic address space utilized by the CPU.

(Program)

The present invention provides a memory control program. The memory control program of the present invention allows a computer of a memory control device for converting the logic address from the CPU into a real address formed of the element selection address and the memory element address and accessing a plurality of memory elements to execute:

an interleave control step of converting the logic address of the CPU utilizing the logic address space divided in N areas into the real address decided by a way number W and accessing the plurality of memory elements by the interleave control and capable of re-configuring the memory configuration by the designation of a different way number W;

a real address area management step of dividing a real address space formed of a plurality of memory elements into areas (N×Wmax) multiplying the area number N of the CPU logic address space by the maximum way number Wmax of the interleave control, and preparing a real address area utilization table common to all way numbers recorded with utilizable information, and recording utilization prohibition information in the area including the abnormal portion of the real address area utilization table when the abnormality of the memory element is detected, and a logic address area management step of generating a logic address area utilization table recorded with utilizable information or utilization prohibition information in each area in the logic address space from the real address area utilization table by corresponding to the memory configuration decided by a way number W of the interleave control step, and deciding the area of the logic address space utilized by the CPU.

(Device)

The present invention provides a memory control device. That is, the memory control device of the present invention includes:

a plurality of memory elements accessed by a real address formed of an element selection address and a memory element address;

an interleave control unit converting a logic address of the CPU utilizing a logic address space divided into N areas to the real address decided by a way number W, and accessing the plurality of memory elements by an interleave control, and capable of reconfiguring a memory configuration by the designation of a different way number W;

a real address area management unit dividing the real address space formed of the plurality of memory elements into areas (N×Wmax) multiplying the area number N of the CPU logic address space by the maximum way number Wmax of the interleave control, and preparing a real address area utilization table common to all way numbers recorded with utilizable information, and recording utilization prohibition information in the area including the abnormal portion of the real address area utilization table when the abnormality of the memory element is detected; and a logic address area management unit generating the real logic area utilization table recorded with utilizable information or utilization prohibition information in each area in the logic address space from the real address area utilization table by corresponding to the memory configuration decided by a way number W of the interleave control unit, and deciding the area of the logic address space utilized by the CPU.

The present invention provides information processing device. That is, the present invention is information processing device including a processing unit;

a storage unit connected to the processing unit and storing information; and a memory control unit for controlling an access to the storage unit, wherein the memory control unit includes:

the control unit converting a logic address from the CPU into a real address and accessing to the storage unit;

a real address management control unit recording utilization prohibition information regarding an area of the storage unit where the abnormality is detected in a first table stored with utilizable or non-utilizable information on the storage unit every area of the real address space of the storage unit; and a logic address area management unit renewing the content of the logic address area utilization table recorded with utilizable or non-utilizable information of each area in the logic address space based on the content of the first table.

According to the present invention, the management of the utilizable area of the memory module seen from the CPU is performed with a memory element address as a reference. The memory address does not depend on a configuration change of the memory, but is decided according to the memory element. When the memory abnormal portion is the same, the memory element address indicating its abnormal place does not change. As the information on the utilizable area by this memory element, a real address area utilization table is prepared, and this real address area utilization table is converted into a logic address area utilization table serving as utilizable area information at the address seen from the CPU corresponding to the memory configuration at that time, and based on the information from this logic address area utilization table, a memory utilizable area is decided.

Hence, as the information on the utilizable area by the memory element address, the real address area utilization table requires only to be prepared and kept, and there is no requirement to keep the memory utilizable information seen from the different CPU address every memory configuration corresponding to the way number of the interleave control, so that the management of the memory utilizable area becomes easy.

Further, when the correspondence of the memory element address and the address seen from the CPU is changed according to the configuration change of the memory, memory degeneration information based on the memory abnormal portion before the change can be taken over, and memory degeneration information at the address seen from a new CPU can be simply prepared.

BRIEF DESCRIPTION OF THE DRAWINGS

FIG. 4 is an explanatory diagram of an address map corresponding to an address conversion of the 1-way interleave in FIG. 3;

FIG. 9 is an explanatory diagram of the divided area number of a real address space for the way number of the interleave control when a CPU address space is taken as an area 8, and a correspondence relationship between CPU addresses and real addresses;

FIGS. 10A to 10C are explanatory diagrams of a real address area utilization table of memory element addresses prepared when a memory reconfiguration is possible by the 1-way and the 2-way, and a logic address area utilization table of the CPU at the time of the 1-way memory configuration prepared from that table;

FIGS. 11A to 11C are explanatory diagrams of the real address area utilization table of the memory element address prepared when the memory reconfiguration is possible by the 1-way and the 2-way, and the logic address area utilization table of the CUP at the time of the 2-way memory configuration prepared from that table;

FIG. 17 is an explanatory diagram of the address map corresponding to the address conversion of the 4-way interleave in FIG. 16;

FIG. 18 is an explanatory diagram of the address map following FIG. 17:

FIGS. 22A and 22B are explanatory diagrams of the real address area utilization table of the memory element address prepared when the memory reconfiguration is possible by the 1-way, the 2-way or the 4-way, and a processing for preparing the logic address area utilization table of the CPU at a time of configuring the 4-way memory from that table;

FIG. 23 is an explanatory diagram of the logic address area utilization table prepared from the real address area utilization table in FIGS. 22A and 22B;

BEST MODE FOR CARRYING OUT THE INVENTION

Figure 1:
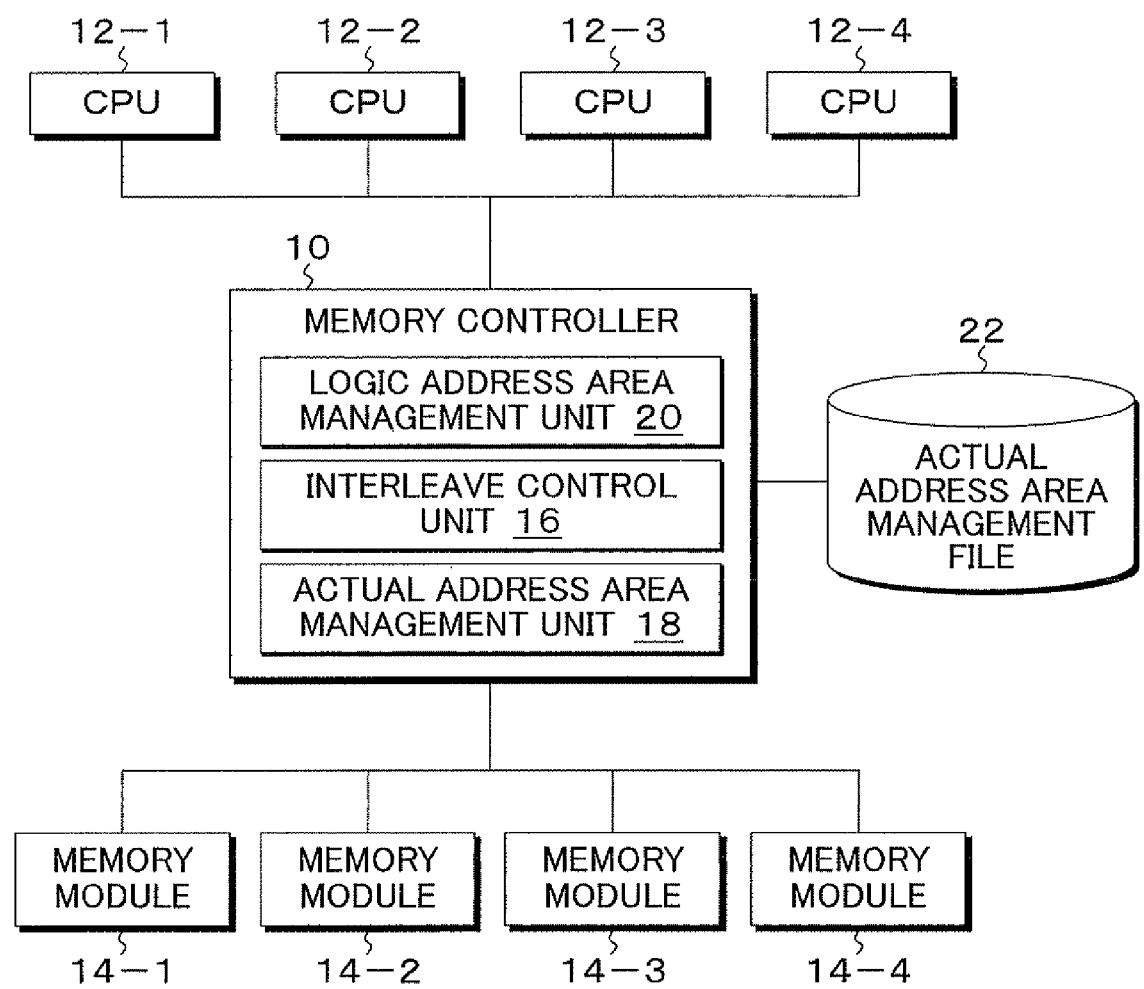
FIG. 1 is a block diagram of a computer system including a memory control device of the present invention.

FIG. 1 is a block diagram of a computer system provided with a memory control device of the present invention. In FIG. 1, a memory controller 10 including the memory control device of the present invention is connected with CPUs 12-1 to 12-4 and memory modules 14-1 to 14-4. The memory controller 10 is provided with an interleave control unit 16, a real address area management unit 18, and a logic address area management unit 20, and further, is connected with a real address area management file 22. The interleave control unit 16 of the memory controller 10 can re-configure a memory configuration by the designation of a different way number W, and an interleave control is performed by the memory configuration of the way number such as a 1-way, a 2-way, and a 4-way which are, for example, a power of two as the way number W. Here, the interleave control is a control which designates the same address for a plurality of memory modules, and accesses a module while alternatively changing over the module by the module selection address, and as compared with the case where the memory module is selected and accessed in order, the interleave control changes over the module in a state in which the address is designated in advance, and therefore, can perform a high speed operation of the memory module. The 2-way interleave means a control by which the same address is designated spanning across the two memory modules, thereby to change over the module, and the 4-way means a control in which the modules are changed over in order and accessed in a state in which the same address is designated for 4 modules. In addition, the 1-way interleave control means an access in which the memory modules are accessed while being selected in order, and an address is not designated spanning across a plurality of memory modules, and therefore, this is an access without the interleave, and for ease of explanation, in the following description, the control without interleave is referred to as a 1-way interleave control. Further, in the interleave control unit 16, to cope with a memory malfunction at the sides of the memory modules 14-1 to 14-4, an area utilization management is performed in which the logic address space seen by CPU addresses of the CPUs 12-1 to 12-4 is divided into a plurality of areas, for example, N areas, and the area corresponding to the abnormal portion is taken as use-prohibition when the memory abnormality is detected. This utilization management area in the CPU space has been conventionally divided into divided areas of the address space of the CPU, thereby to prepare the logic address area utilization table stored with the area utilization information, that is, the utilizable or utilization prohibition information, and based on this table, the area of the logic address space utilized by the CPU is decided. However, in the present invention, the logic address area utilization table for managing such logic address space of the CPU is not fixedly held by the memory controller 10, and based on the memory element addresses at the sides of the memory modules 14-1 to 14-4, the real address area utilization table convertible into the logic address area utilization table of the logic address space of the CPU is prepared and held. That is, the real address area management unit 18 provided in the memory controller 10 divides the real address space formed of the memory modules 14-1 to 14-4 into the areas (N×Wmax) multiplying the area number N of the logic address space at the CPU side by the maximum way number Wmax from among different way numbers W re-configurable by the interleave control unit 16, and prepares the real address area utilization table sharable by the memory configurations of all the way numbers recorded with utilizable information every this divided area in the initial state.

This real address area utilization table is recorded with the utilization prohibition information in the area of the real address area utilization table including the abnormal portion when the abnormality of the memory modules 14-1 to 14-4 is detected. The real address area utilization table common with all the way numbers reconfigurable of the memory configuration by the interleave control unit 16 prepared by the real address area management unit 18 is stored in the real address area management file 22. The logic address area management unit 20 of the memory controller 10, at a time of rising the computer system or at a time of re-configuring the memory configuration in the interleave control unit 16, divides the logic address space at the CPU side into N areas from the real address area utilization table stored in the real address area management file 22, and prepares the logic address area utilization table recorded with utilizable information or utilization prohibition information in each case, and based on the prepared logic address area utilization table, decides the area of the logic address space utilized by the CPUs 12-1 to 12-4 at the time of rising or the memory reconfiguration. In this manner, in the memory control of the present invention, when the real address area utilization table capable of generating the area of the logic address space at the CPU side seen from the real address of the memory modules 14-1 to 14-4 is prepared and stored so as to decide the memory configuration according to the way number by the interleave control unit 16, then by the conversion processing corresponding to the memory configuration decided by that way number, the logic address area utilization table corresponding to the interleave control of the way number at that time from the real address area utilization table held in the real address area management file 22 is prepared in each case, and the area of the logic address space utilized by the CPU can be decided.

As a result, even when the memory configuration is changed in the memory controller 10, the area utilization information before the change is taken over after the change, and the utilizable information or utilization prohibition information on the area in the address space of the CPU is simply generated, thereby making it possible not to incorporate the abnormal portion located in any position of the memory modules 14-1 to 14-4 into the area at the CPU side. With respect to such memory control of the present invention, a specific description will be made on the case as an example where the memory reconfiguration is possible by the designation of the way number 1 or 2 by the interleave control unit 16.

Figure 2:
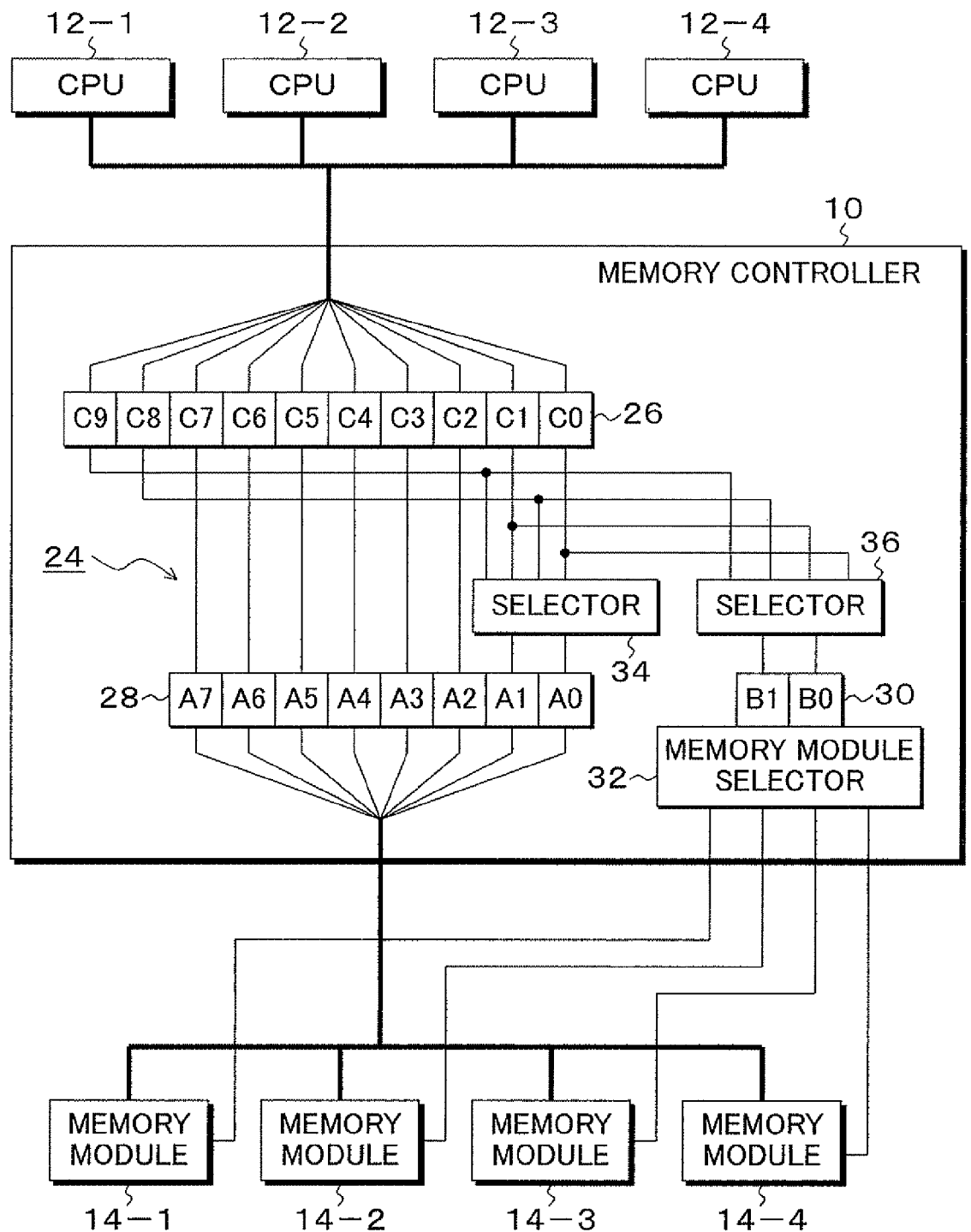
FIG. 2 is an explanatory diagram of an address conversion mechanism of a memory controller in FIG. 1.

FIG. 2 is an explanatory diagram of an address conversion mechanism capable of reconfiguring the memory configuration of the interleave control by setting the way number of the memory controller 10 in FIG. 1. In FIG. 2, the memory modules 14-1 to 14-4 are 256 bytes, respectively, and a total size of 1024 bytes is taken as an example. With respect to such memory space of the 1024 bytes formed of the memory modules 14-1 to 14-4, the sides of the CPUs 12-1 to 12-4 divides the memory space into N=8 areas to manage the utilizable information. The size of one area at the CPU side is 128 bytes.

The memory space of the 1024 bytes formed of the memory modules 14-1 to 14-4 can be accessed by CPU addresses C9 to C0 of 10 bits from the CPUs 12-1 to 12-4. Hence, the memory controller 10 is provided with an input address register 26 for holding the CPU addresses C9 to C0 of 10 bits. On the other hand, the real addresses of the memory modules 14-1 to 14-4 are formed of the memory element addresses A7 to A0 of 8 bits accessing each of the memory modules 14-1 to 14-4 and the element selection addresses B1 and B0 of 2 bits for selecting the memory modules 14-1 to 14-4. Hence, the side of the memory modules 14-1 to 14-4 are provided with an output address register 28 storing the memory element addresses A7 to A0 and a module selection register 30 holding the element selective addresses B1 and B0, and the address of the module selection register 30 is inputted to a memory module selector 32, and by B1 and B0=00, 01, 10, and 11, the memory modules 14-1 to 14-4 can be selected in order. Between the input address register 26 and the output address register 28, selectors 34 and 36 are provided.

The selector 34 performs a change-over connection of the high order 2 bits C9 and C8 of the input address register 26 and the low order 2 bits A1 and A0 of the output register 28. The selector 36 performs change-over connection for the high order 2 bits C9 and C8 of the input address register 26 and the element section bits B1 and B0 of the module selection register 30 of the low order 2 bits C1 and C0. Here, the way number in the interleave control of the memory controller 10 takes the change-over of the memory configuration by three of the 1-way, the 2-way, and the 4-way as an example, and by the changeover connection by the selectors 34 and 36, the connection for realizing the address conversion mechanism by the 1-way, the 2-way or the 4-way is allowed to be established. Hence, by the module selection register 30 and the selectors 34 and 36 provided to the input address register 26, the output address register 28, and the memory module selector 32, a way memory configuration 24 by the interleave control can be constructed.

Figure 3:
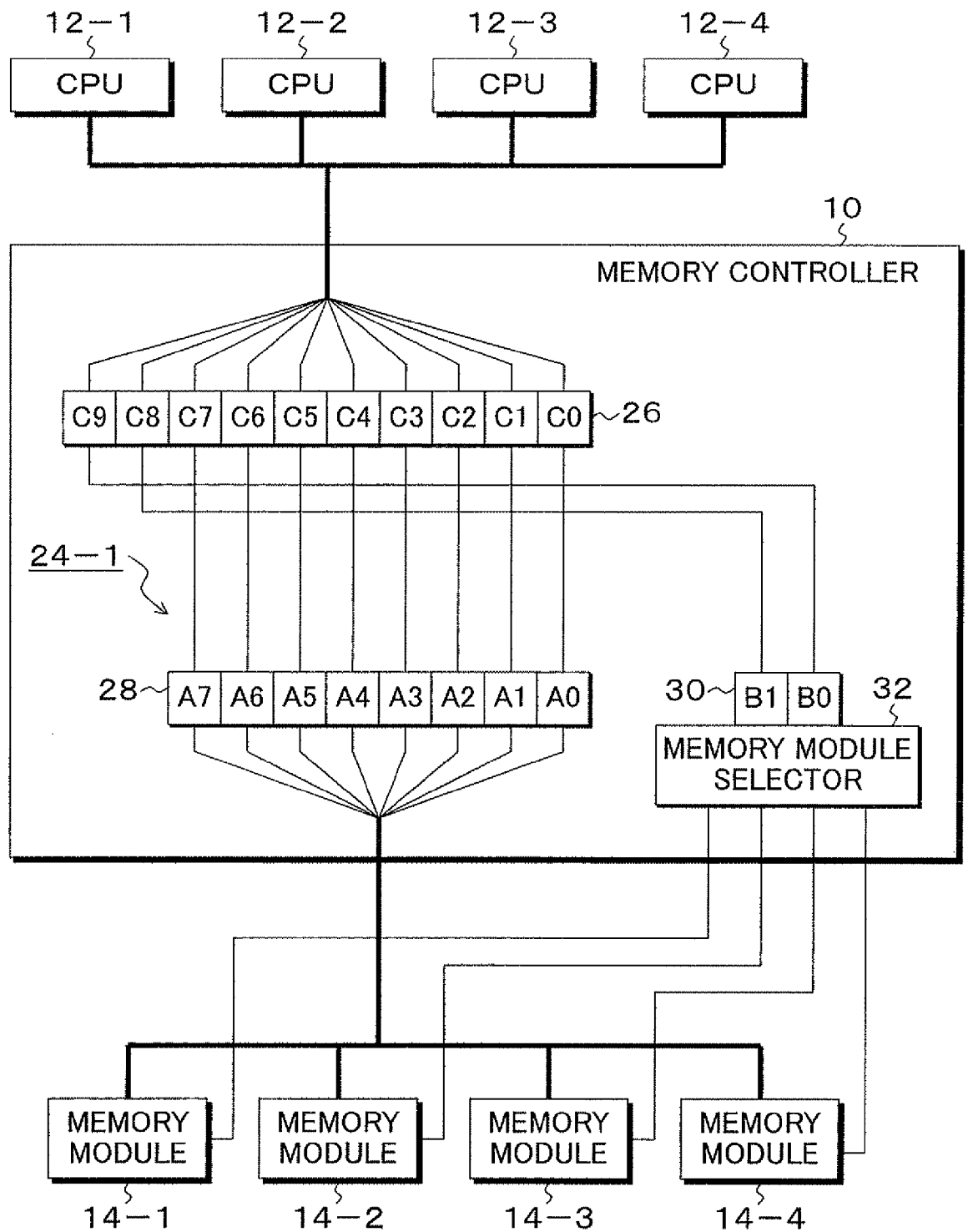
FIG. 3 is an explanatory diagram of the address conversion mechanism by a memory configuration of a 1-way interleave.

FIG. 3 is an explanatory diagram of the address conversion mechanism by the memory configuration of a 1-way interleave. In FIG. 3, the memory controller 10 establishes the connection of the output address resister 28 and the module selection register 30 for the input address register 26 of the illustrated 1-way memory configuration 24-1 by the connection change-over by the selectors 34 and 36 shown in FIG. 2, and as a result, the CPU addresses C9 to C0 of 10 bits from the CPUs 12-1 to 12-4 in a state held in the input address register 26 are converted into the memory element addresses A7 to A0 of 8 bits of the memory modules 14-1 to 14-4 of the output address resistor 28 and the element selection addresses B1 and B0 for the module selection, thereby to execute a memory access according to the 1-way interleave. The 1-way memory configuration 24-1 is the case without interleave, and in this case, the high order 2 bits C9 and C8 of the CPU address are converted into the element selection addresses B1 and B0, and the low order 8 bits C7 to C0 of the CPU address are converted into the memory element addresses A7 to A0, thereby to be accessed.

FIG. 4 is an explanatory diagram of a 1-way address bit map 38-1 corresponding to the address conversion of the 1-way interleave in FIG. 3. In FIG. 4, the 1-way address map 38-1 displays the CPU addresses C9 to C0 and the element selection addresses B1 and B0 serving as real addresses, and the memory element addresses A7 to A0 by dividing them into the memory selection and the memory address in the upper column, and shows the address bit and the address decimal view corresponding to this address bit when the CPU addresses C9 to C0 are changed in order from all 0 to all 1.

Figure 5:
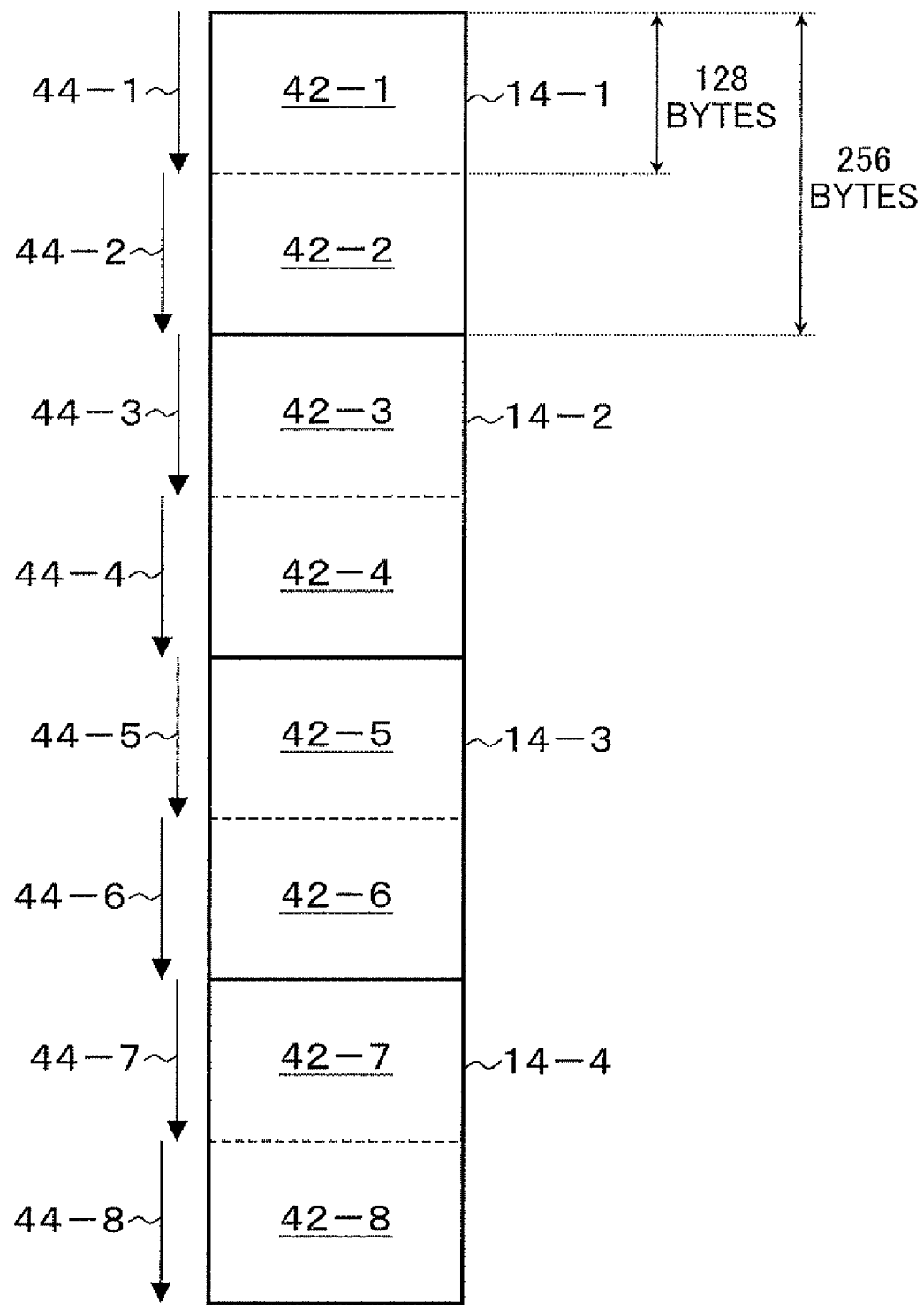
FIG. 5 is an explanatory diagram of an access of a memory module by the 1-way interleave.

FIG. 5 is an access explanatory diagram of the memory module by the 1-way interleave, and the access in this case is simple, and though the four memory modules 14-1 to 14-4, as shown by the dotted line, are divided into eight areas of 42-1 to 42-8 when seen from the CPU side, when the CPU addresses are changed from all 0 to all 1 in order, an access can be made in order of the memory modules 14-1 to 14-3, that is, in order of the areas 42-1 to 42-8 seen from the CPU side as shown in arrow marks 44-1 to 44-8. Here, assuming that, in the address [11111111] of the memory module 14-1 in FIG. 3, that is, in the address number 255 by the decimal view, a memory abnormality occurs in which data cannot be read and written, and this is the abnormal portion 40 in the 1-way address map 38-1 in FIG. 4, and this becomes [0011111111] when seen from the CPU addresses C9 to C0, and even when shown by the decimal view, it becomes the same address number 255.

Figure 6:
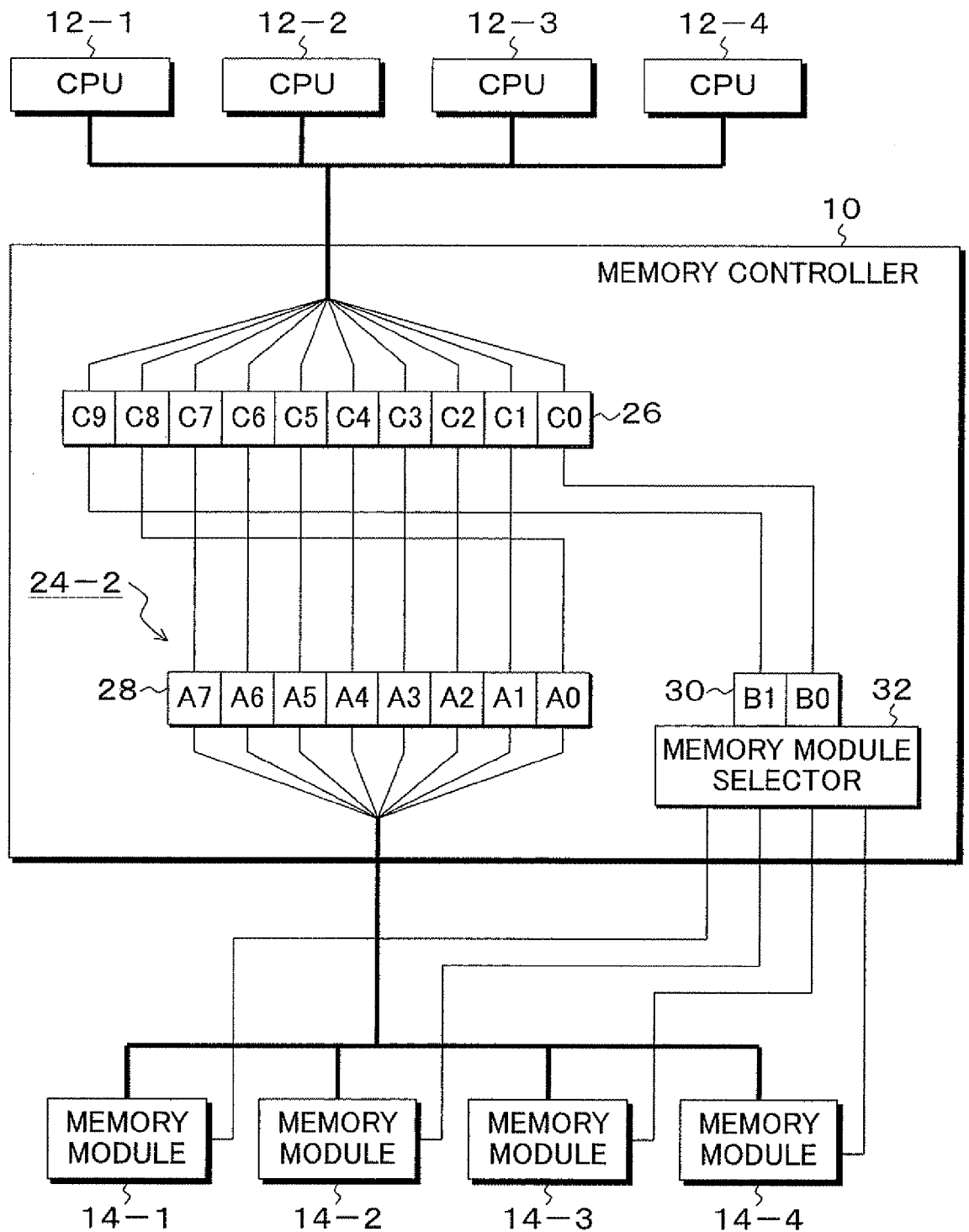
FIG. 6 is an explanatory diagram of the address conversion mechanism by the memory configuration of a 2-way interleave.

FIG. 6 is an explanatory diagram of the address conversion mechanism by the memory configuration of the 2-way interleave. In the memory controller 10 in FIG. 6, by designating the way number W of the interleave control as the 2-way, the connection between the output address register 28 for the input address register 26 shown in the 2-way memory configuration 24-2 and the module selection register 30 provided in the memory module selector 32 is established.

Figure 7A:
FIGS. 7A and 7B are explanatory diagrams of the address map corresponding to the address conversion of the 2-way interleave in FIG. 6.
Figure 7B:
Figure 8:
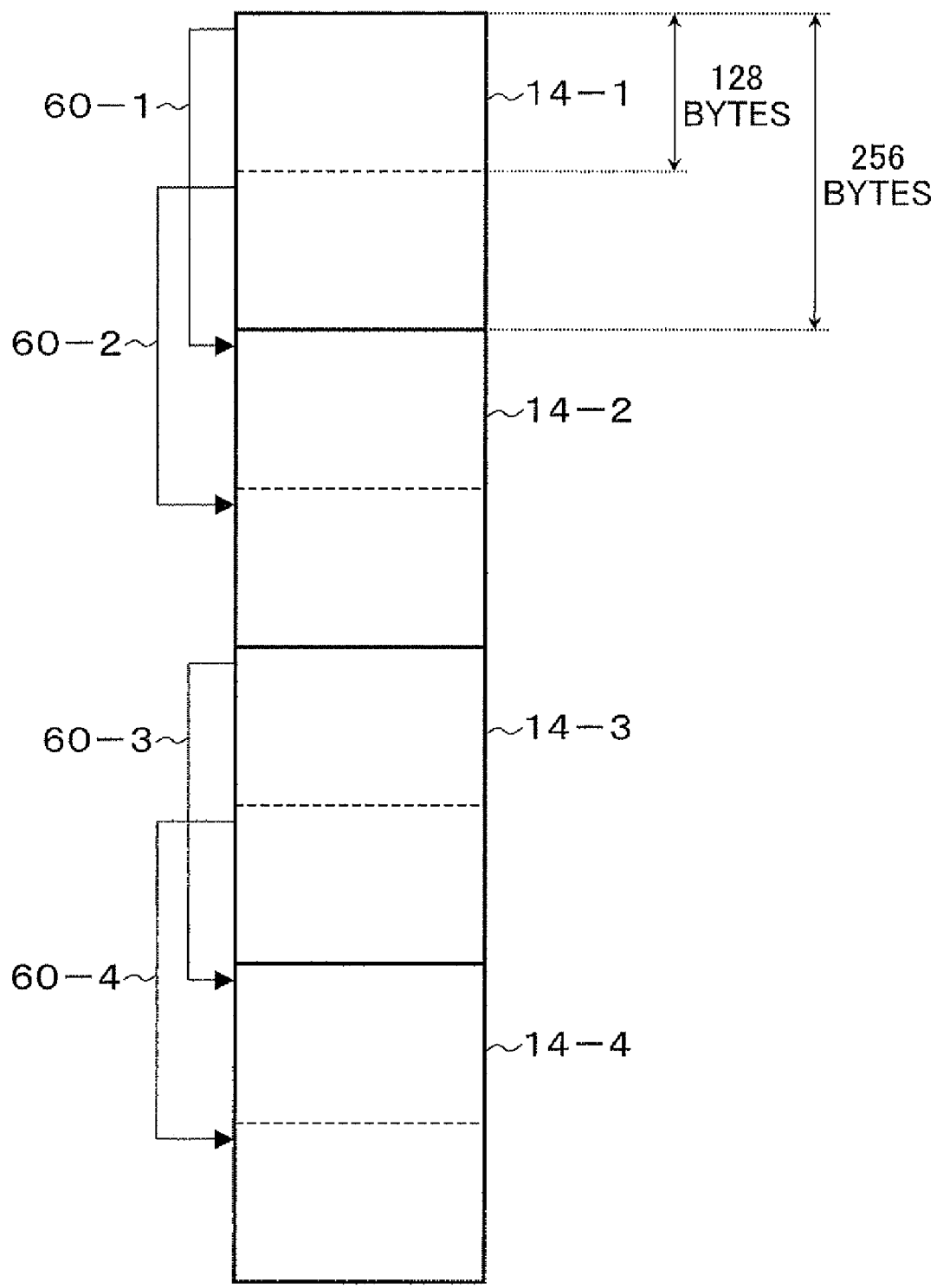
FIG. 8 is an explanatory diagram of the access of the memory module by the 2-way interleave.

FIGS. 7A and 7B are explanatory diagrams of the 2-way address map 38-2 corresponding to the address conversion of the 2-way interleave in FIG. 6. In this 2-way interleave control, as shown in the memory modules 14-1 to 14-4 in FIG. 8, with respect to the area of 128 byte unit decided by the divided number at the CPU side of the two memory modules 14-1 to 14-2, in a state in which the same addresses as the memory module 14-1 and the memory module 14-2 are designated by the initial address as shown by an arrow mark 60-1, the memory modules 14-1 and 14-2 are changed over in order by the element selection address, thereby to perform an access for two address portion. This control is performed for the first half areas of the memory modules 14-1 and 14-2, and after that, this control is repeated for the second half area. Subsequently, with respect to the next memory modules 14-3 and 14-4, as shown by the arrow marks 60-3 and 60-4, sequential reading of the first half area divided into 128 bytes by the designation of the same address and sequential reading of the second half area by the designation of the same address are repeated. Thus, the 2-way address map 38-2 in FIGS. 7A and 7B by such 2-way interleave can be divided into an even number address area 58-1 and an odd number address area 58-2 targeted to the memory modules 14-1 and 14-2, and an even address number address area 58-3 and an odd number address area 58-4 targeted to the memory modules 14-3 and 14-4 for the change from all 0 to all 1 of the CPU addresses C9 to C0.

In the first half even number address area 58-1 and odd number address area 58-2, as shown in the memory select address, the element selection addresses B1 and B0 are alternately changed to "00" and "01", so that the 2-way interleave control is performed in which the module selection is performed in a state in which the same addresses are designated for two memory modules 14-1 and 14-2. This holds true with the memory modules 14-3 and 14-4 corresponding to the second half even number address area 58-3 and odd number address area 58-4. In such 2-way address map 38-2, the abnormal portion 40 in the 1-way address map 38-1 shown in FIG. 4 on the map can be stored as the same address position.

FIG. 9 is an explanatory diagram of the divided area number N of the CPU address space in the memory control, the interleave way number W, the divided area number M of the real address space given as a value multiplying the divided area number N of the CPU address space by the maximum number W max, and further, a correspondence relationship between the CPU and the corresponding real memory address in the present invention. That is, the correspondence table in FIG. 9 represents the conversion relationship of the address conversion mechanism in each memory configuration, assuming that N=8, W=1, 2, 4, and M=8, 16, and 32.

Figure 10A:
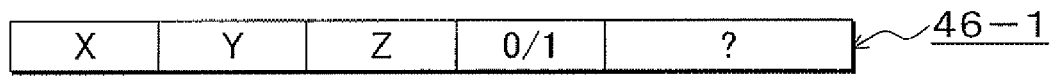
Figure 10B:
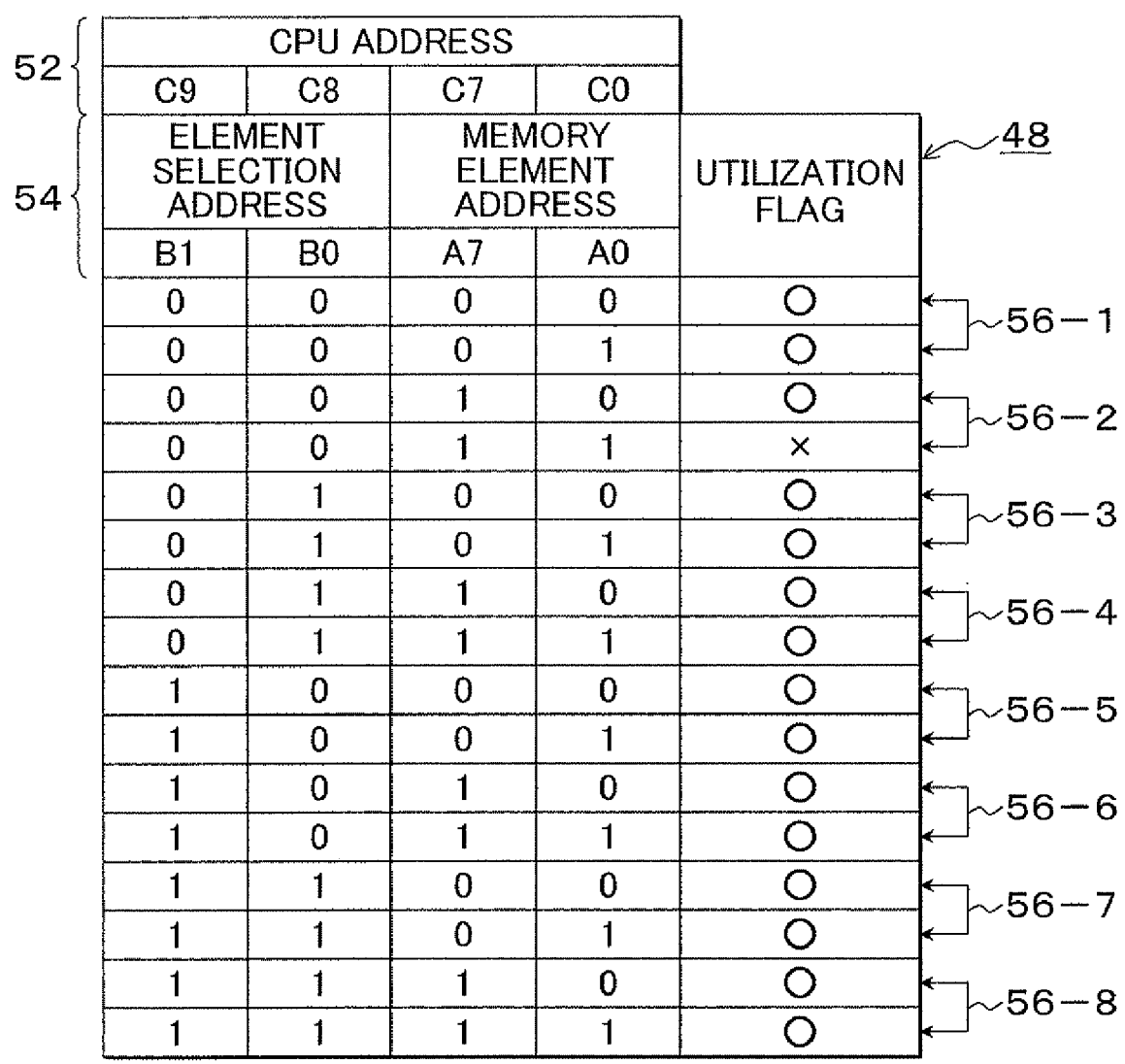

FIGS. 10A to 10C are explanatory diagrams of the real address utilization table generated by the real address area management unit 18 when the memory reconfiguration by the 1-way and the 2-way is possible by the interleave control unit 16 of the memory controller 10 in FIG. 1, and the logic address area utilization table used by the 1-way memory configuration prepared from the real address utilization table by the logic address area management unit 20. FIG. 10A is a 1-way search register 46-1 used for preparing a 1-way logic address area utilization table 50-1 shown in FIG. 10C from a real address area utilization table 48 shown in FIG. 10B. First, the real address area utilization table 48 in FIG. 10B, as shown in an item column 54, stores an utilization flag by dividing into 16 areas decided by the correspondence table in FIG. 9 using the element selection address including the real addresses of the memory modules 14-1 to 14-4 and the memory element address. The real addresses stored in this real address area utilization table 48, similarly to the item 52 added by way of explanation on the upper portion of the real address area utilization table 48, are corresponded by 4 bits of C9, C8, C7, and C0 of the CPU address by the address conversion mechanism shown in the 1-way memory configuration 24-1 in FIG. 3. Here, the utilization flag of the real address area utilization table 48 is described with "○" as utilizable information, and the area including the abnormal portion 40 shown in FIG. 4 is recorded with "X" as utilization prohibition information. When the 1-way logic address area utilization table 50-1 in FIG. 10C required for the memory configuration of the 1-way interleave control is prepared from such real address area utilization table 48, the utilization flag of the real address area utilization table 48 is checked by using the 1-way search register 46-1 in FIG. 10A. The 1-way search register 46-1 is formed of the areas X, Y, and Z, and also [0/1] and the storing area of the utilization flag, and when the real address area utilization table 48 is to be checked, X=B1,
Y=B0,
Z=A7,
and A0=0/1 are stored, and two areas of 4-bit address are checked, where the high order 3 bits are the same, and the fourth bit is changed to 0 or 1. The investigation of the real address area utilization table 48 by such 1-way search register 46-1, as shown by arrow marks on the right side of the table, checks whether the utilization flag is utilizable "○" or utilization prohibited "X" with respect to two areas each of area pairs 56-1 to 56-8, and when both from the two areas are utilizable "○", the corresponding utilization flag of the area in FIG. 10C is made utilizable "○", and when either one is utilization prohibited "X", the utilization flag of the logic address area utilization table 50-1 in FIG. 10C is taken as utilization-prohibited "X". When looking at the 1-way logic address area utilization table 50-1 prepared from such real address area utilization table 48, the second area #1 in the CPU area is found to be utilization prohibited "X".

Figure 11A:
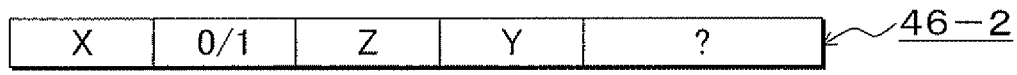
Figure 11B:
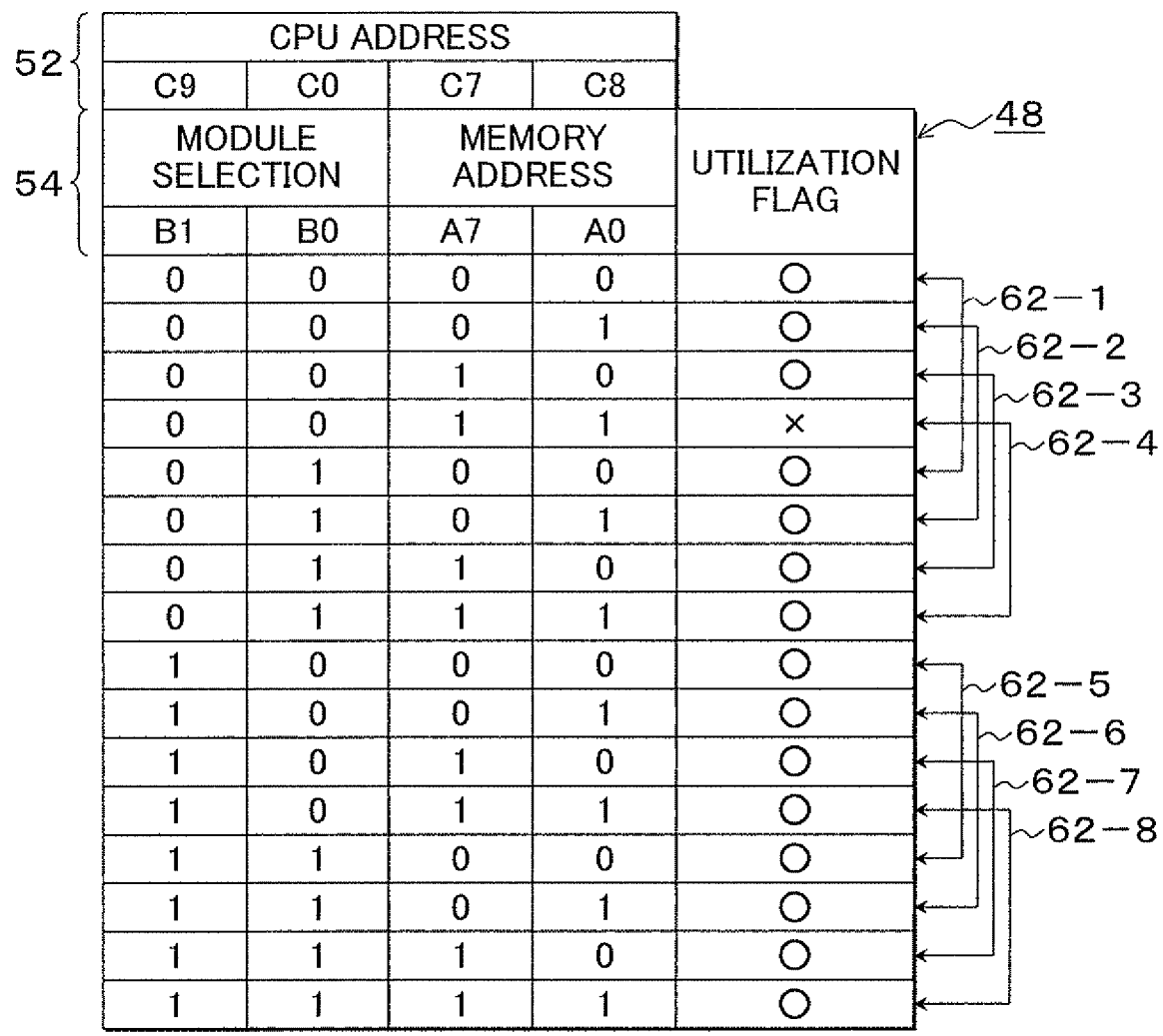

FIGS. 11A to 11C are explanatory diagrams of the processing for preparing the 2-way logic address area utilization table at a time of configuring the memory by the 2-way interleave control by using the same real address area utilization table 48 as in FIG. 10B. FIG. 11A is a 2-way research register 46-2 performing the investigation for preparing a 2-way logic address area utilization table 50-2 in FIG. 11C from the real address area utilization table 48 in FIG. 11B. The 2-way research register 46-2 is stored with X=B1
B0=0/1,
Z=A7,
and Y=A0 from the high order side, and the utilization flag of the area decided by the respective 4 bit areas is checked. The investigation of the real address area utilization table 48 using this 2-way research register 46-2 makes the utilization flag of the area corresponding to the 2-way logic address area utilization table 50-2 in FIG. 11C utilizable "○" when the utilization flags of the two areas with respect to the area pairs 62-1 to 62-8 shown by the arrow marks at the right side are both utilizable "○", and makes the utilization flag of the area corresponding to the 2-way logic address area utilization table 50-2 utilization-prohibited [X] when either area is utilization-prohibited "X". As a result, the CPU area including the memory abnormal portion of the 2-way logic address area utilization table 50-2 in the memory configuration by the 2-way interleave control is determined to be a fourth CPU area #3.

Figure 12:
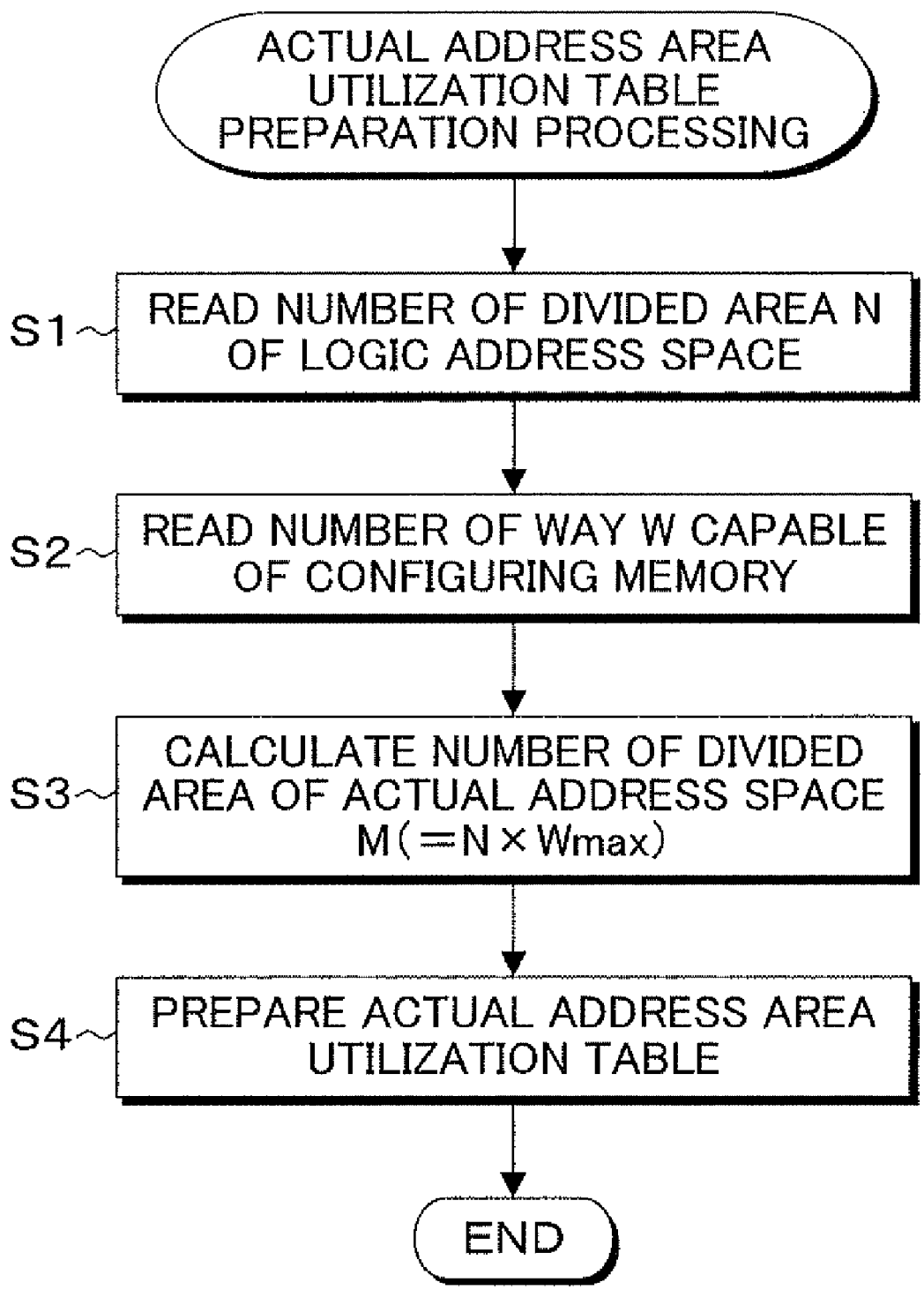
FIG. 12 is a flowchart of a real address area utilization table preparing processing for the memory element address in the present invention.

FIG. 12 is a flowchart of the processing for preparing the real address area utilization table seen from the memory element address in the present invention. In FIG. 12, a preparing processing for the real address area utilization table reads a divided area number N of the logic address space, for example, N=8 at step S1, and at step S2, reads a memory configurable way number W, for example, W=1, 2, and 4, and at step S3, multiplies the area number N of the logic address space by the maximum way number Wmax, thereby to calculate the divided number M of the real address space. For example, when change over is possible between the 1-way and the 2-way, the divided number of 16 areas is determined as M=8×2=16. Subsequently, at step S4, for example, when the 1-way and the 2-way reconfigurations as shown in FIG. 10B are possible, a real address area utilization table having the area divided into 16 parts by using 4 bits of the element selection addresses B1, B0 and the most significant bit A7 and the least significant bit A0 of the memory element address is prepared, and is recorded with utilizable "○" as its utilization flag, that is, utilization information at a time of the initial preparation.

Figure 13:
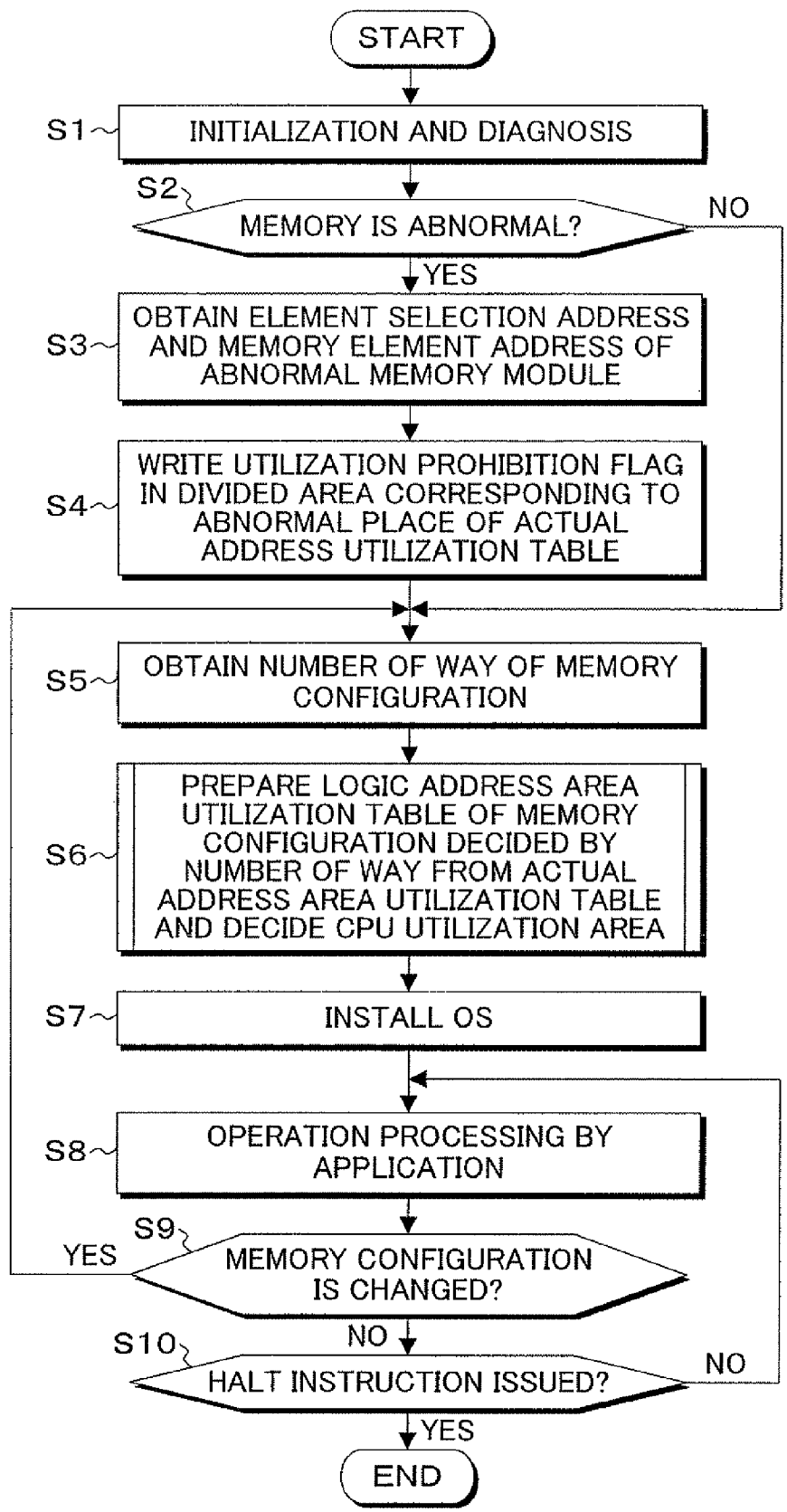
FIG. 13 is a flowchart of a computer system preparing the logic address area utilization table of the memory configuration corresponding to the way number from the real address area utilization table prepared by the processing in FIG. 12 and deciding the utilizable area of the CPU.

FIG. 13 is a flowchart of the computer system preparing the logic address table of the memory configuration according to the way number of the interleave control from the real address area utilization table prepared by of the processing in FIG. 12, and deciding the utilization area of the CPU. In FIG. 13, the computer system executes an initialization and a diagnosis accompanied with the power activation at step S1, and at step S2, if the memory abnormality is also detected, at step S3, the computer system obtains the element selection address and the memory element address of the abnormal memory module, and at step S4, writes utilization-prohibition information in the divided areas corresponding to the abnormal portion of the already prepared real address area utilization table. Needless to say, if the memory abnormality is not available at step S2, the processings at steps S3 and S4 are skipped. Subsequently, at step S5, the way number of the memory configuration is obtained, and at step S6, the logic address area utilization table of the memory configuration decided by the way number from the real address utilization table is prepared, thereby to decide the utilization area of the CPU. Subsequently, at step S7, accompanied with the boot processing for the computer, the installation of an OS is performed, and at step S8, the operative processing by an application is started. During this operative processing, at step S9, when the memory configuration is changed, the processing returns to step S5, and the way number after the change accompanied with the change of this memory configuration is obtained, and at step S6, the logic address area utilization table of the memory configuration decided by the way number after the memory configuration change from the real address area utilization table is prepared to decide the utilization area of the UPU, and through the installation of the OS from step S7 by re-activation and the like, the operative processing by the application of step S8 is started.

Figure 14:
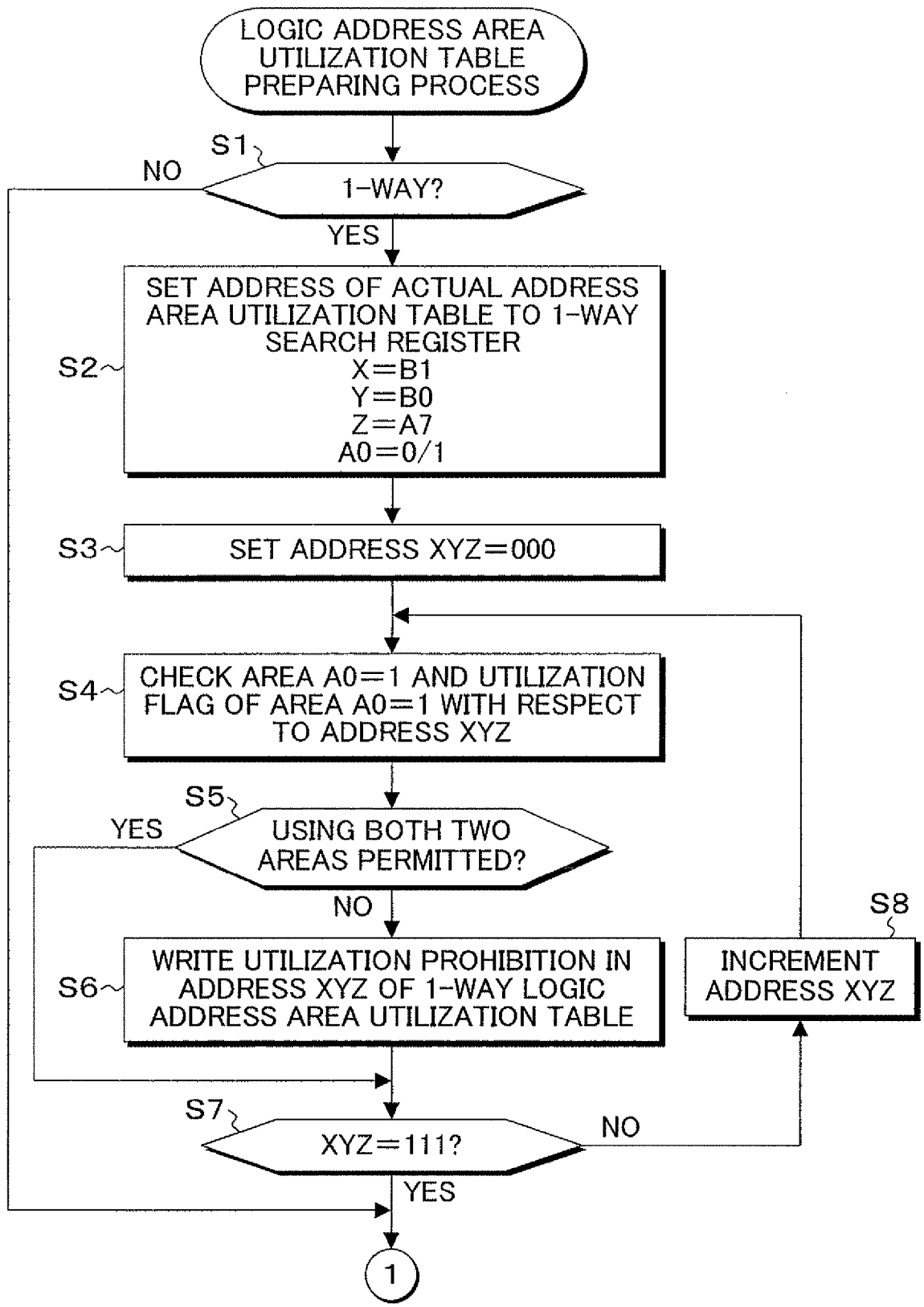
FIG. 14 is a flowchart of the processing for preparing the logic address area utilization table at the time of the 1-way memory configuration at step S6 in FIG. 13.

FIG. 14 is a flowchart of the processing for preparing the logic address area utilization table at a time of configuring the 1-way memory by step S6 of FIG. 13. In FIG. 14, at step S1, when it is determined that the memory configuration by the interleave is a 1-way, the processing proceeds to step S2, and after disposing 4 bits at the real address side of the real address area utilization table 48 in the 1-way search register 46-1 in FIG. 10A, at step S3, the addresses X and Y are set to all 0, and at step S4, the utilization flags in the areas of A0=0 and A0=1 in the real address area utilization table 48 are investigated with respect to the addresses X, Y, and Z. At step S5, when both of the two areas are utilization permitted "○", step S6 is skipped, and when at least either one of the two areas is utilization prohibited "X", at step S6, the utilization prohibition "X" is written in the areas corresponding to the addresses X, Y, and Z at that time in the 1-way logic address area utilization table 50-1 in FIG. 10C. Subsequently, at step S7, it is checked whether or not the addresses X, Y, and Z are the final addresses, and when they are not the final addresses, at step S8, the addresses X, Y, and Z are incremented by one, and the processing from step S4 is repeated.

Figure 15:
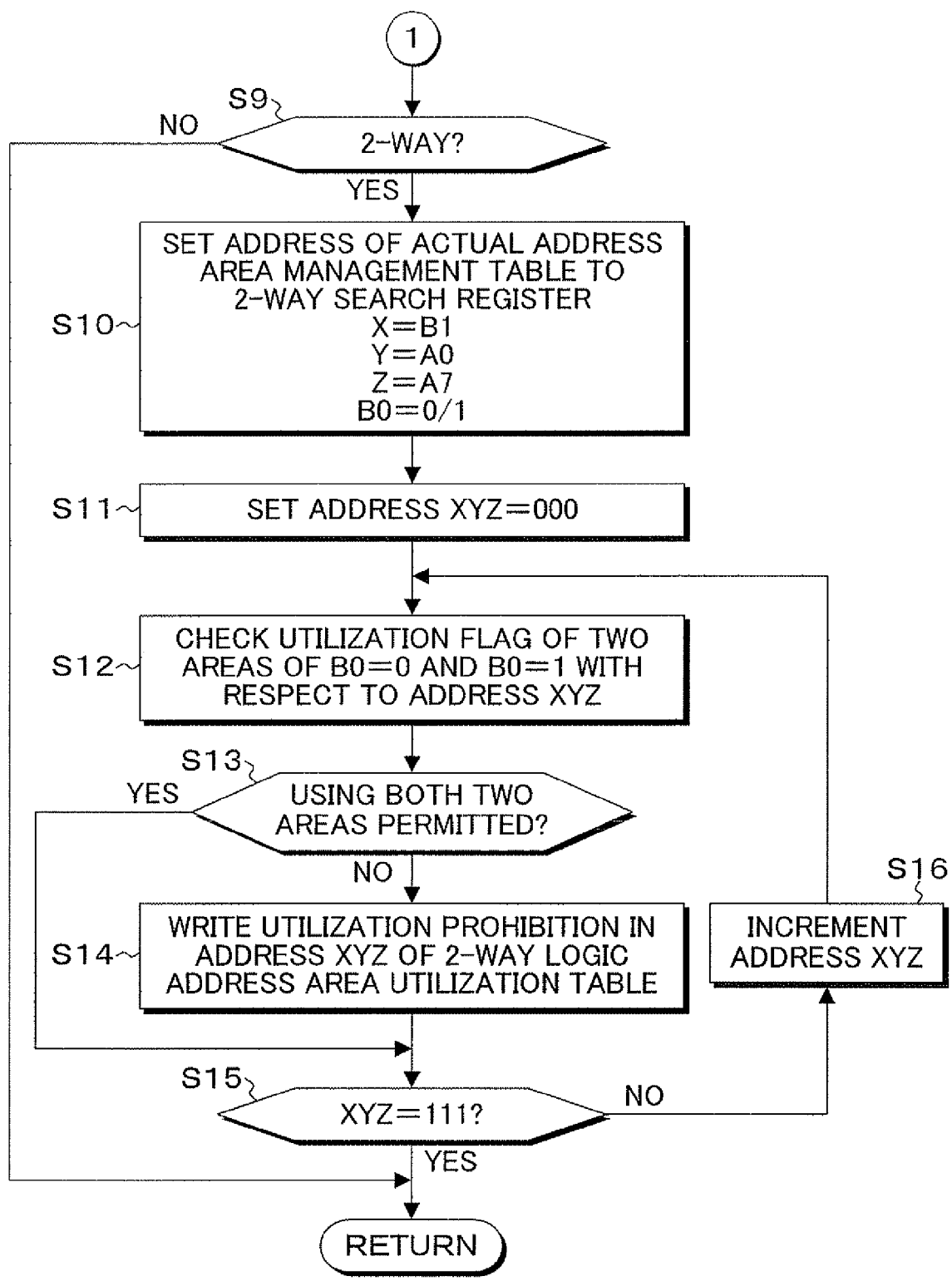
FIG. 15 is a flowchart of the processing for preparing the logic address area utilization table at the 2-way memory configuration following FIG. 14.

FIG. 15 is a flowchart of the processing for preparing the logic address area utilization table at a time of configuring the 2-way memory following FIG. 14. In FIG. 15, when it is determined that, at step S9, the memory configuration is a 2-way, the processing proceeds to step S10, and sets the address of the real address area utilization table 48 in FIG. 11B to the 2-way search register 46-2 shown in FIG. 11A. Subsequently, at step S11, after the addresses X, Y, and Z are set to the initial value of all 0, at step S12, the utilization flags of the two areas of B0=0 and B0=1 are investigated with respect to the addresses X and Y. Subsequently, at step S13, when both of the utilization flags in the two areas are utilization permitted "○", step S14 is skipped. When at lease either one is utilization prohibited "X", the processing proceeds to step S14, the areas corresponding to the addresses X, Y, and Z of the 2-way logic address area utilization table 50-2 shown in FIG. 11C are written with utilization prohibition "X". Subsequently, at step S15, it is checked whether or not the addresses X, Y, and Z are the final addresses, and if not, the processing returns to step S16 so as to increment the addresses X, Y, and Z by one, thereby repeating the processing from step S12. Next, in the interleave control unit 16 provided in the memory controller 10 in FIG. 1, the preparation of the real address area utilization table when the 1-way, the 2-way, and the 4-way memory configurations are possible as the memory configuration by the interleave control, and the preparation of the logic address area utilization table generated therefrom will be described.

Figure 16:
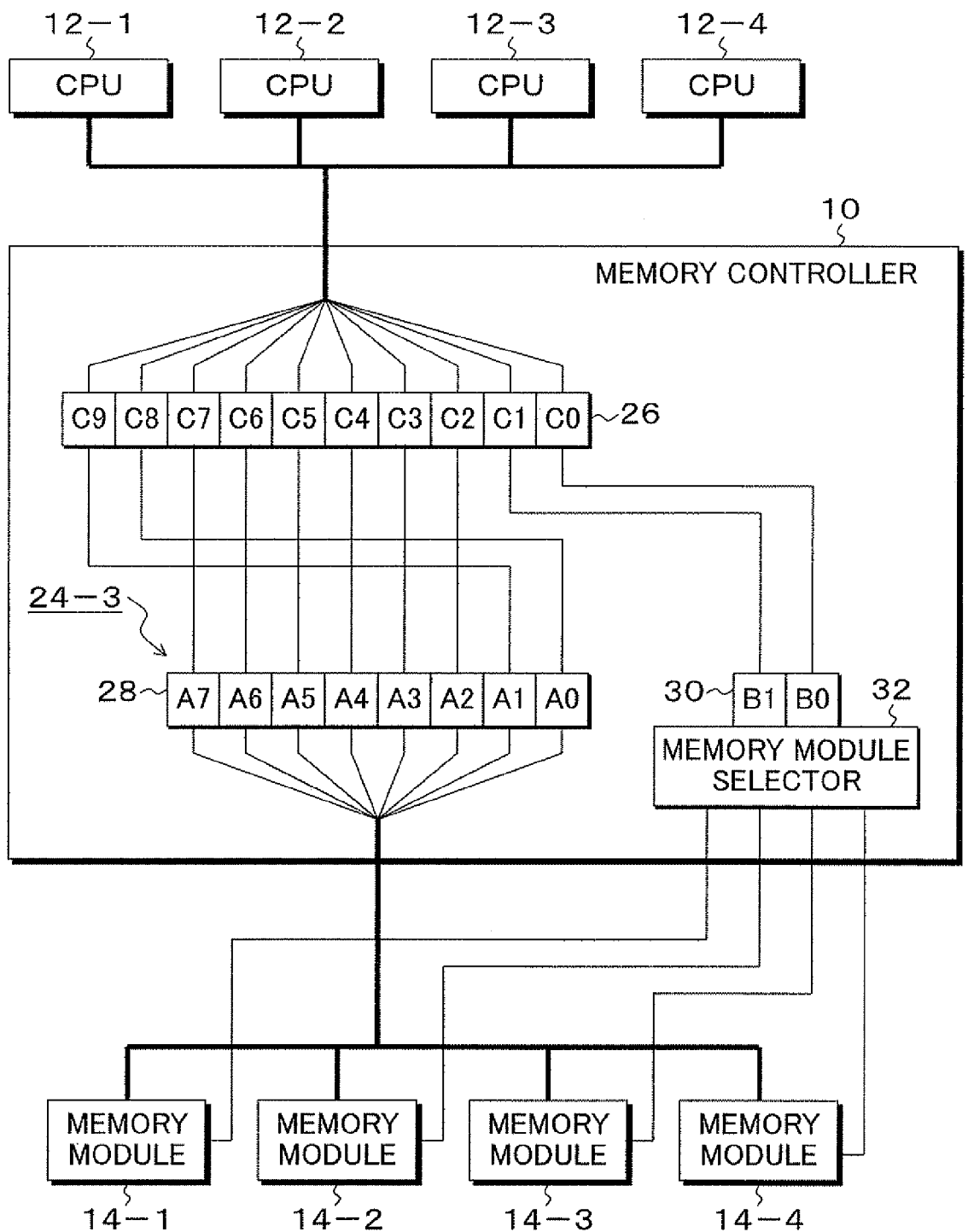
FIG. 16 is an explanatory diagram of the address conversion mechanism by the memory configuration of a 4-way interleave.

FIG. 16 is an explanatory diagram of the address conversion mechanism by the memory configuration of the 4-way interleave, and for the input address register 26 in the memory controller 10, the output address register 28 and the module selection register 30 are connected as illustrated, thereby establishing a 4-way memory configuration 24-3.

FIGS. 17 and 18 are explanatory diagrams of a 4-way address map 38-3 corresponding to the address conversion of the 4-way interleave in FIG. 16.

Figure 19:
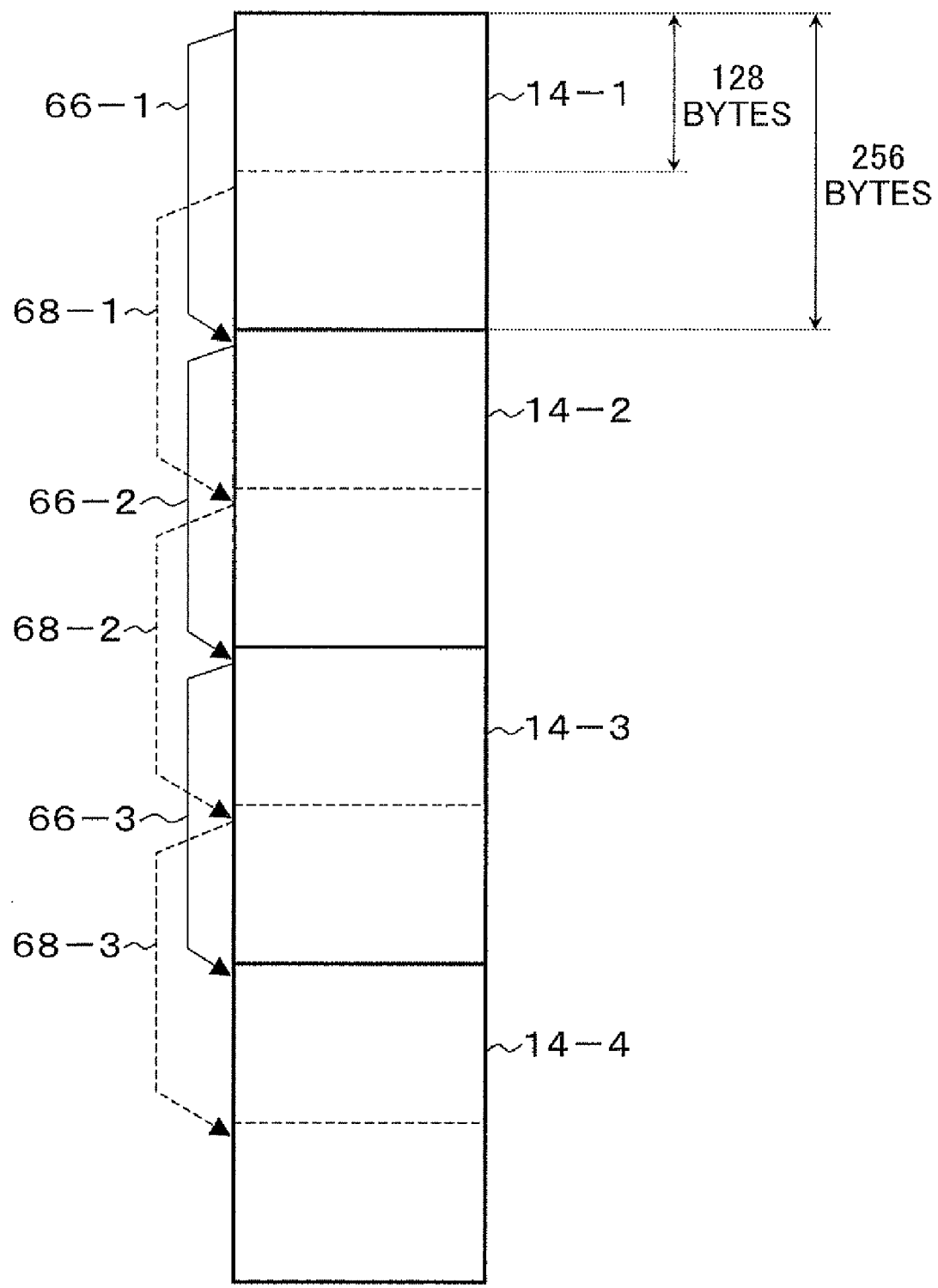
FIG. 19 is an explanatory diagram of the access of the memory module by the 4-way interleave.

FIG. 19 is an explanatory diagram of the access of the memory module by the 4-way interleave. In FIG. 19, in the 4-way interleave control, the memory modules 14-1 to 14-4 having a size of 256 bytes are divided into 128 byte areas according to the divided number 8 at the CPU side, and as shown in the arrow marks 66-1 to 66-3, the memory modules 14-1, 14-2, 14-3, and 14-4 are selected in order by the element selection address in a state of designating the same address with respect to the first half of the memory modules 14-1 to 14-4, thereby performing an access of the 4-way interleave.

After this is repeated for the first half area of the memory modules 14-1 to 14-4, the second half area is changed over in order by the element selection address as shown in the arrow marks 68-1, 68-2, and 68-3 in a state of designating the same address with respect to the four memory modules 14-1 to 14-4, thereby repeating an access by the 4-way interleave. In the 4-way address map 38-3 in FIGS. 17 and 18 by such 4-way interleave control, first, as shown in a first address area 64-1, with respect to each of the memory module 14-1 to 14-4, the access is performed by the 4-way interleave by jumping every four addresses such as address number 0, 4, 8, . . . as shown in the address decimal view, and subsequently, similarly to the second address area 64-2, the interleave is performed by a four address placement such as the address number 1, 5, 7, . . . by the decimal view, and further, in a third address area 64-3, the access of the 4-way interleave such as the address number 2, 6, 12, . . . is performed, and further, as shown in a fourth address area 64-4 in FIG. 18, the access by the 4-way interleave such as the address number 3, 7, 11, . . . is performed.

Figure 20A:
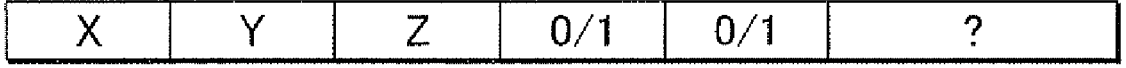
FIGS. 20A and 20B are explanatory diagrams of the real address area utilization table of the memory element address prepared when the memory reconfiguration is possible by the 1-way, the 2-way or the 4-way, and a processing for preparing the logic address area utilization table of the CPU at a time of configuring the 1-way memory from that table.
Figure 20B:
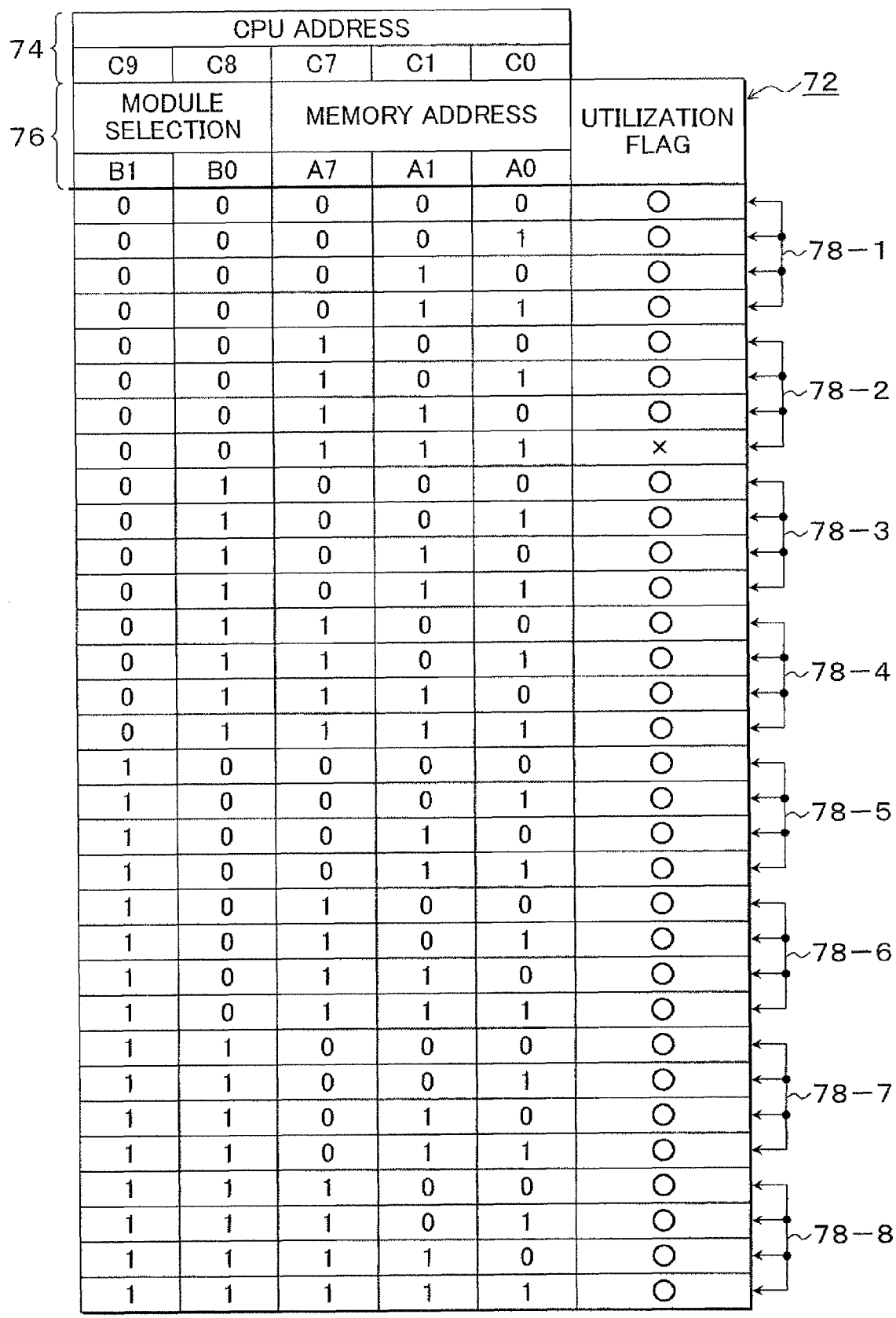

FIGS. 20A and 20B are explanatory diagrams of the real address area utilization table prepared when the memory reconfiguration is possible by the 1-way, the 2-way, and the 4-way, and the processing for preparing the logic address area utilization table of the CPU address at a time of configuring the 1-way memory therefrom. FIG. 20A is an explanatory diagram of a 1-way search register 70-1 used for preparing the 1-way logic address table from a real address area utilization table 72 in FIG. 20B. First, the real address area utilization table 72 corresponding to the 1-way, the 2-way, and the 4-way in FIG. 20B divides the real address area into 32 areas by further adding a memory address bit A1 to the real address area utilization table 48 corresponding to the 1-way and the 2-way shown in FIG. 10B, thereby making the real address area utilization table 48 as 4 bits. A 1-way search register 70-1 in FIG. 20A adds the address bit A1=0/1 of the memory address to the 1-way search register 46-1 in FIG. 10A, and by using this 1-way register 70-1, a real address area utilization table 72 is investigated, so that the same 1-way logic address area utilization table 50-1 as shown in FIG. 10C can be prepared. The investigation of the real address area utilization table 72 by the 1-way search register 70-1 records utilizable "○" in the utilization flag corresponding to the 1-way logic address area utilization table 50-1 in FIG. 10C when the utilization flags of the four areas are all utilizable "○" with respect to each of the groups 78-1 to 78-8 serving as one group made of the four areas. When at least one of the areas formed of one group is utilization prohibited "X", the utilization flag of the 1-way logic address area utilization table 50-1 in FIG. 10C is written with utilization prohibition "X".

Figure 21A:
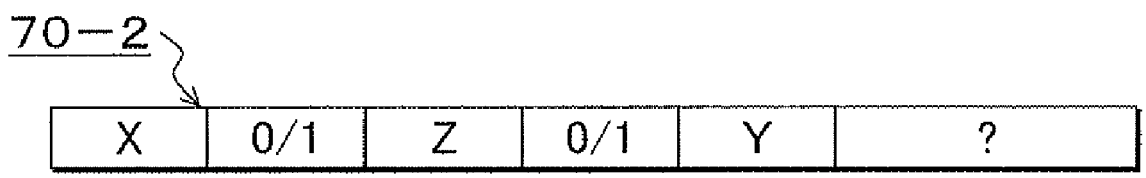
FIGS. 21A and 21B are explanatory diagrams of the real address area utilization table of the memory element address prepared when the memory reconfiguration is possible by the 1-way, the 2-way, or the 4-way, and a processing for preparing the logic address area utilization table of the CPU at a time of configuring the 2-way memory from that table.
Figure 21B:
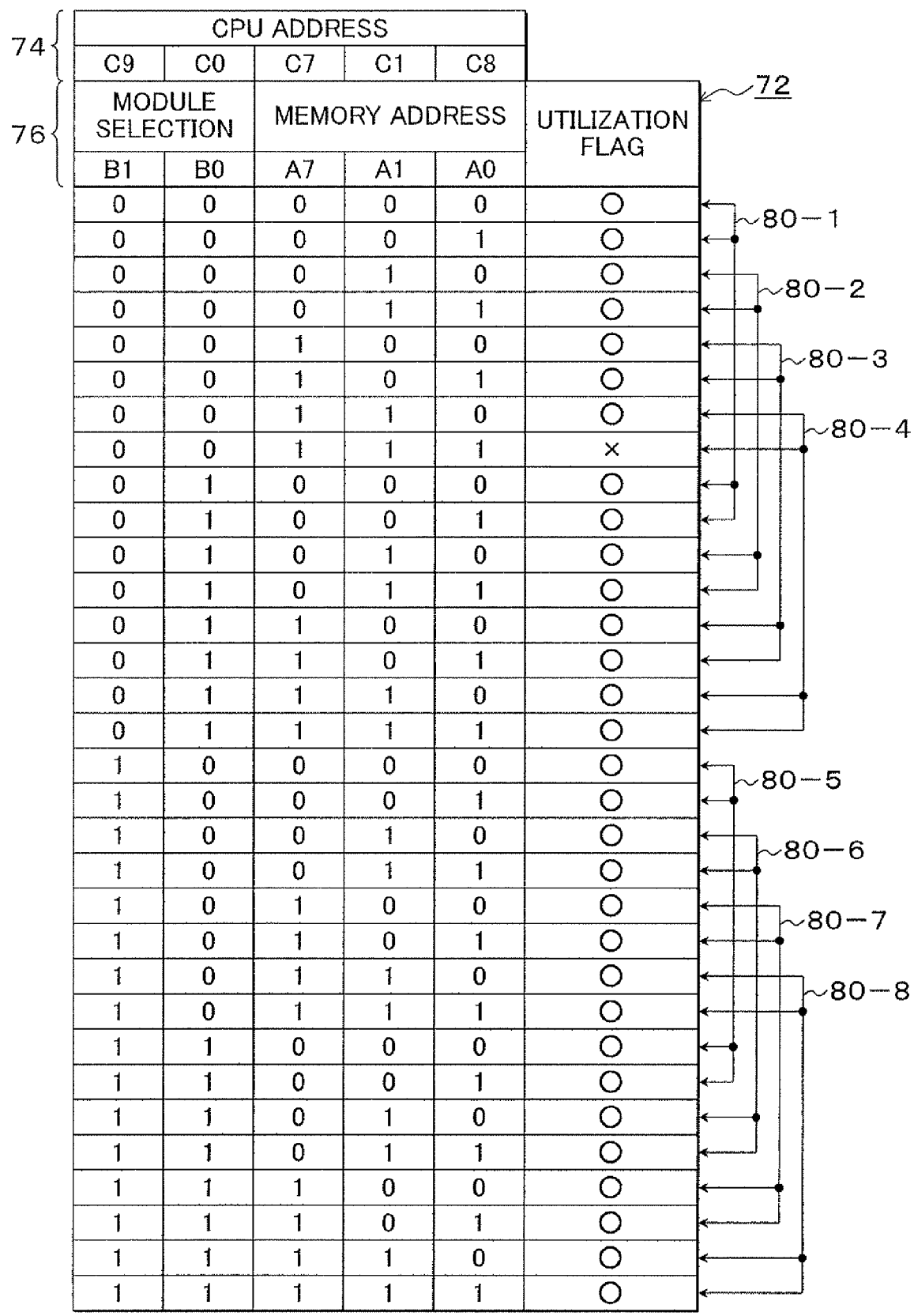

FIGS. 21A and 21B show a processing for preparing the same 2-way logic address area utilization table 50-2 as in FIG. 11C by investigating by the 2-way search register 70-2 in FIG. 21A by using the same real address area utilization table 72 as in FIG. 20B. In this case, each of the utilization flags of the groups 80-1 to 80-8 of the four areas shown by the arrow marks at the right side in the real address area utilization table 72 is checked by the 2-way search register 70-2, and when the utilization flags of the four areas are all utilizable "○", the 2-way logic address area utilization table 50-2 is recorded with utilizable "○", and when at least either one of the four areas is utilization disapproved "X", the 2-way logic address area utilization table 50-2 is recorded with utilization prohibition "X".

Figure 22A:
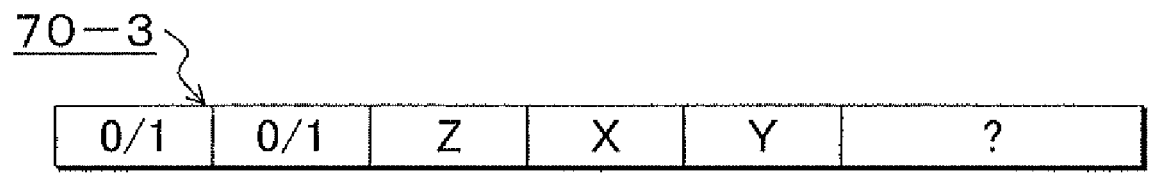
Figure 22B:
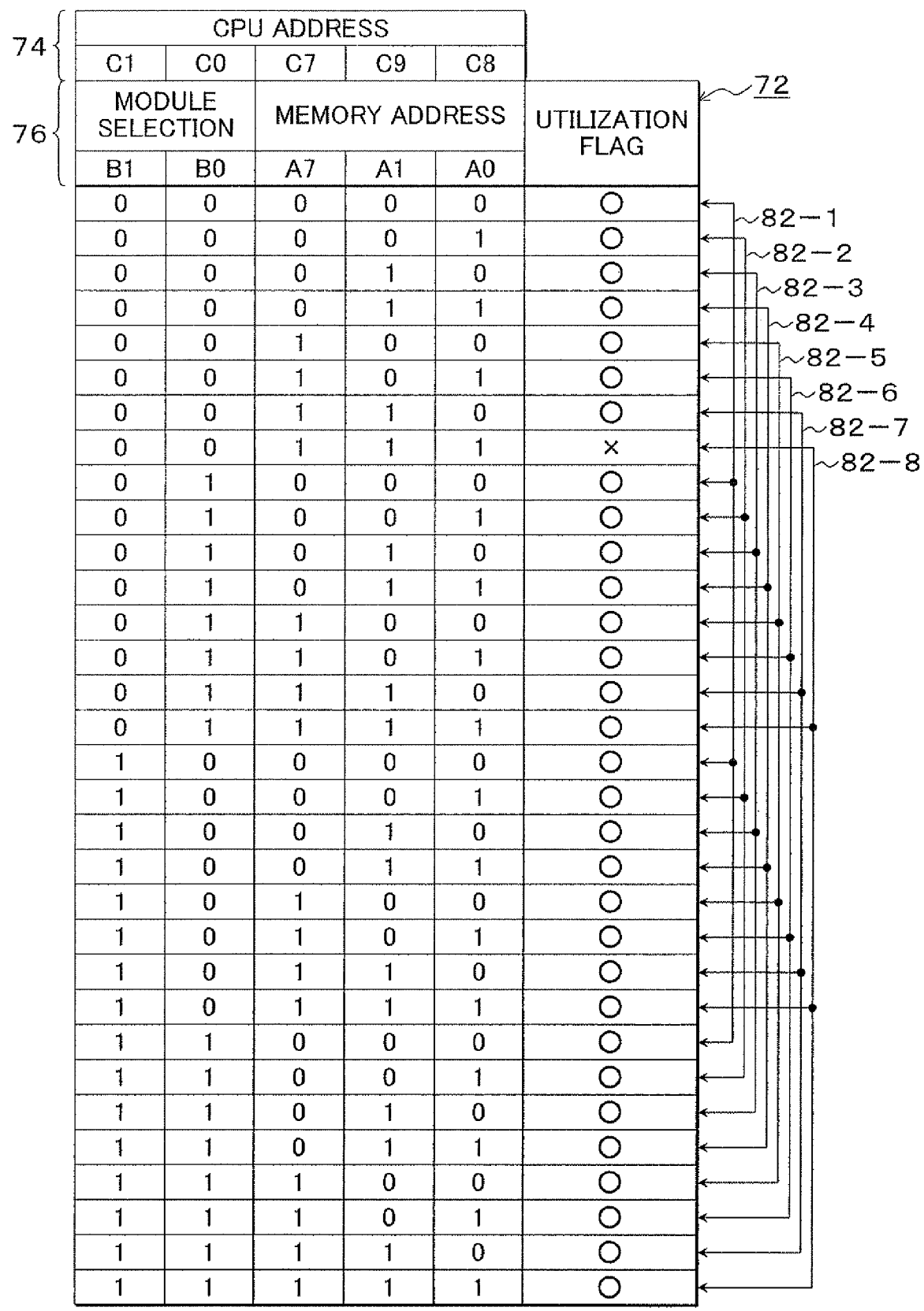

FIGS. 22A and 22B are explanatory diagrams of the processing for preparing the logic address area utilization table corresponding to the 4-way memory configuration by using the same real address area utilization table 72 as in FIG. 20B. FIG. 22A is a 4-way search register 70-3 used for the investigation of the real address area utilization table 72, and setting
X=A1,
Y=A0,
Z=A7,
B0=0/1,
and B3=0/1.

That is, while changing the addresses X, Y, and Z by 000 to 111, B1 and B0 are changed into four stages of 00, 01, 10, and 11 for every position, thereby to investigate the real address area utilization table 72. By the investigation of the real address area utilization table 72 using this 4-way search register 70-3, the corresponding utilization flags of the 4-way logic address area utilization table 50-3 in FIG. 23 are recorded with utilizable "○" when the utilization flags of the four areas are all utilizable "○" with respect to groups 82-1 to 82-8 of the four areas shown by the arrow marks at the right side thereof. On the other hand, when at least either one of the utilization flags of the four areas is utilization prohibited "X", the utilization flag of the 4-way logic address area utilization table 50-3 in FIG. 23 is stored with the utilization prohibition "X". When looking at such 4-way logic address area utilization table 50-3 in FIG. 23 prepared from such real address area utilization table 48, the eighth area #7 of the CPU area is utilization prohibited "X". In this manner, even when the memory configuration can be reconfigurable with respect to the 1-way, the 2-way and the 4-way, one real address area utilization table 72 seen from the memory element address is prepared and stored, and after that, the logic address area utilization table corresponding to each of the way numbers is prepared by the investigation, that is, the conversion operation of the real address area utilization table corresponding to the way numbers of the interleave control deciding the memory configuration every time the memory configuration is established, thereby the utilizable area at the CPU side can be decided.

Figure 24:
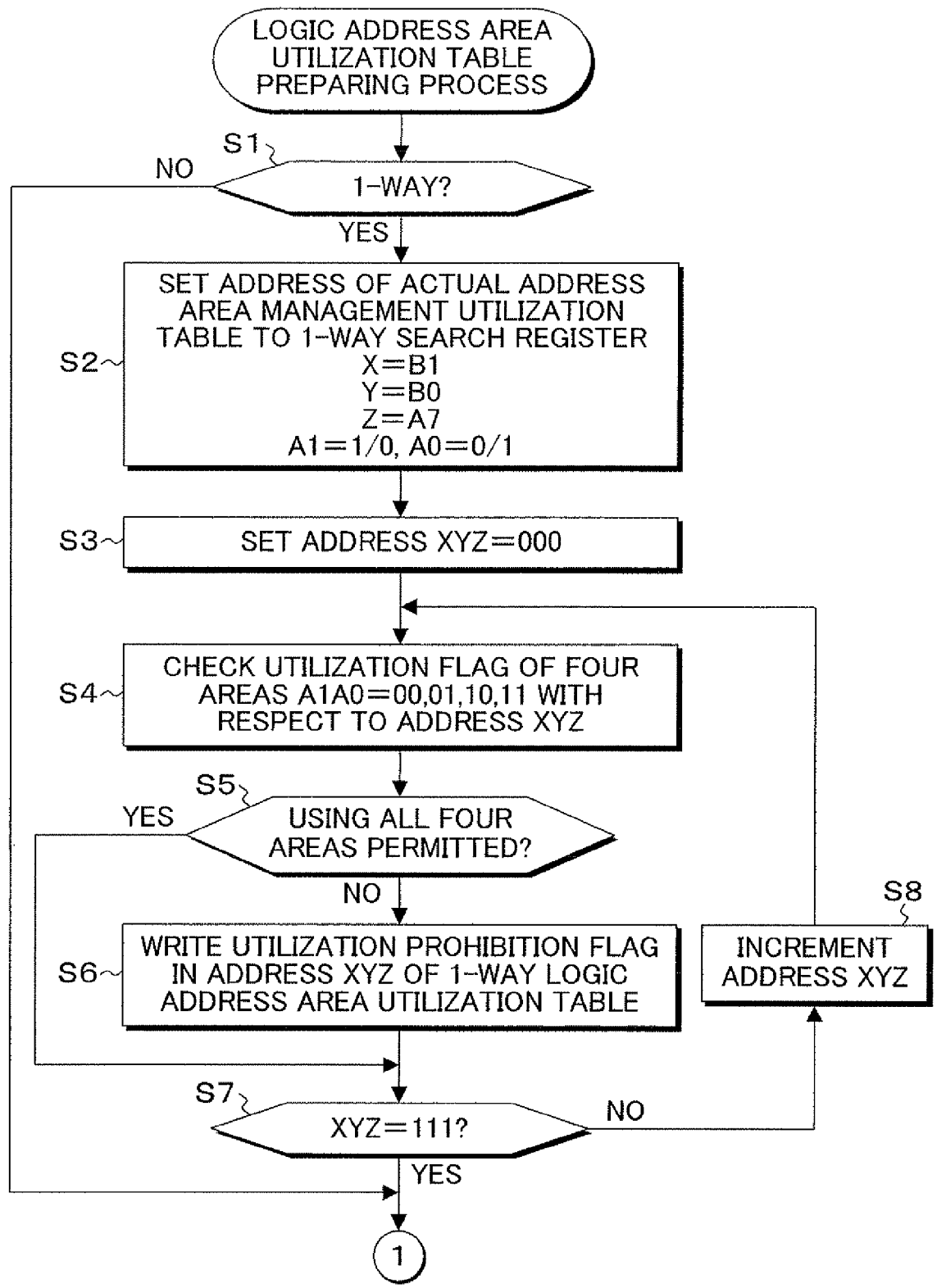
FIG. 24 is a flowchart of the processing for preparing the logic address area utilization table at a time of configuring the 1-way memory from the real address area utilization table corresponding to the 1-way, the 2-way, or the 4-way.

FIG. 24 shows a processing for preparing the logic address area utilization table at a time of configuring the 1-way memory from the real address area utilization table shown in FIGS. 20A and 20B. At step S1, when the 1-way is determined, at step S2, the address of the real address area utilization table 72 is set to the 1-way search register 70-1, and at step S3, after the addresses X, Y, and Z are set to the initial value, at step S4, the utilization flags for the four areas of A1, A0=00, 01, 10, and 11 with respect to the addresses X, Y, and Z are investigated. Subsequently, at step S5, when all the four areas are utilization permitted, step S6 is skipped, and when at least any one of the four areas is utilization prohibited, at step S6, the addresses X, Y, and Z of the 1-way logic address area utilization table is written with utilization prohibition. Such processing is repeated until the final addresses of the addresses X, Y, and Z are determined at step S7, while incrementing the addresses X, and Y at step S8.

Figure 25:
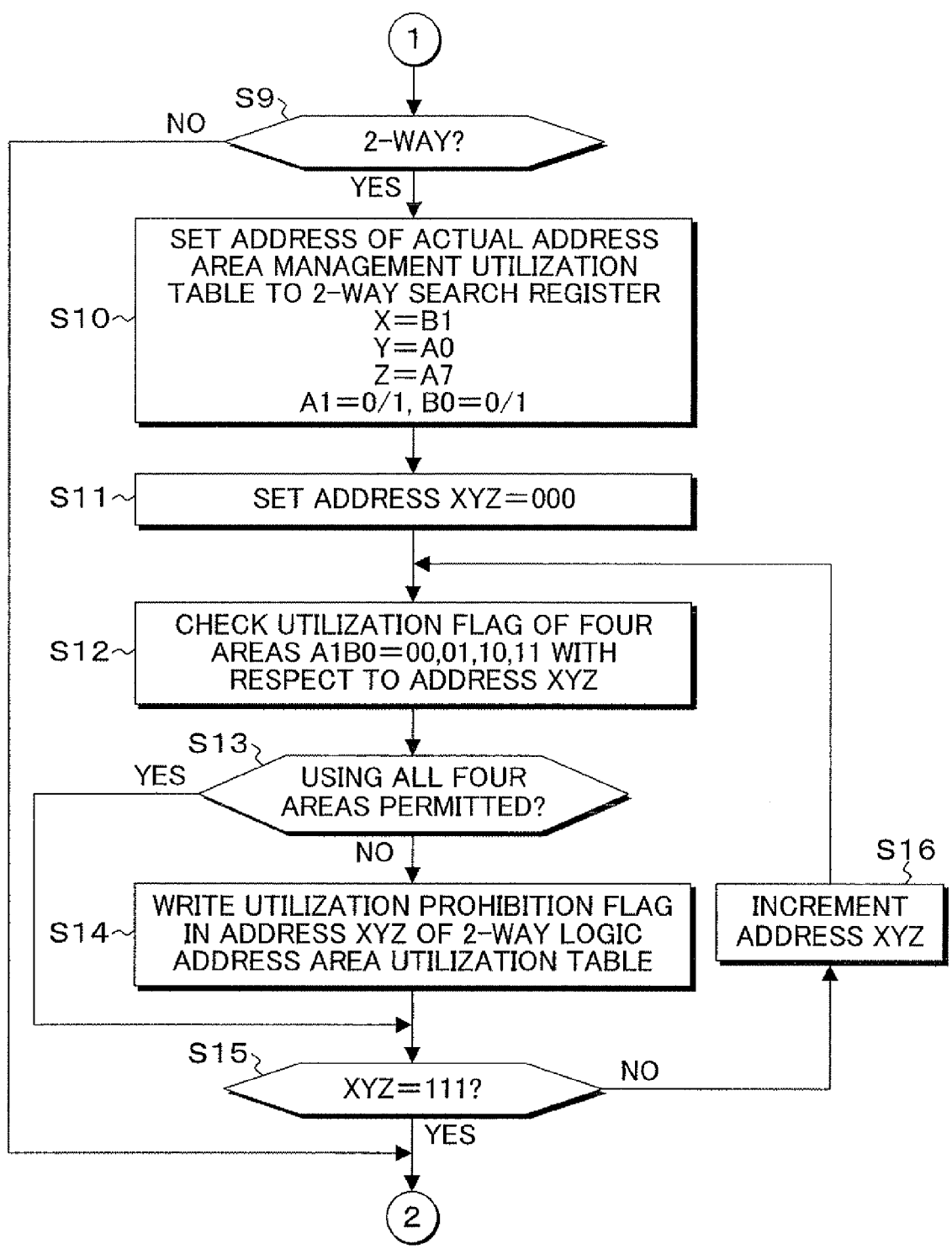
FIG. 25 is a flowchart of the processing for preparing the logic address area utilization table at a time of configuring the 2-way memory from the real address area utilization table corresponding to the 1-way, the 2-way, or the 4-way.

FIG. 25 is a flowchart of the processing for preparing the logic address area utilization table at a time of the 2-way memory configuration time from the real address area utilization table 72 in FIGS. 21A and 21B. In FIG. 25, at step S9, when the 2-way memory configuration is determined, at step S10, the address of the real address area utilization table 72 is set to the 2-way search register 70-2, and at step S11, after the addresses X, Y, and Z are set to the initial address, at step S12, the utilization flags of the four areas of A1, B0=00, 01, 10, and 11 are investigated with respect to the addresses X, Y, and Z. Subsequently, at step S13, when all the four areas are utilization permitted "○", step S14 is skipped, and when at least any one of the four areas is utilization disapproved "X", at step S14, the areas of addresses X, Y, and Z of the 2-way logic address area utilization table are written with utilization prohibition "X". This processing from step S12 is repeated until the final addresses are determined at step S15, while incrementing the addresses at step S16.

Figure 26:
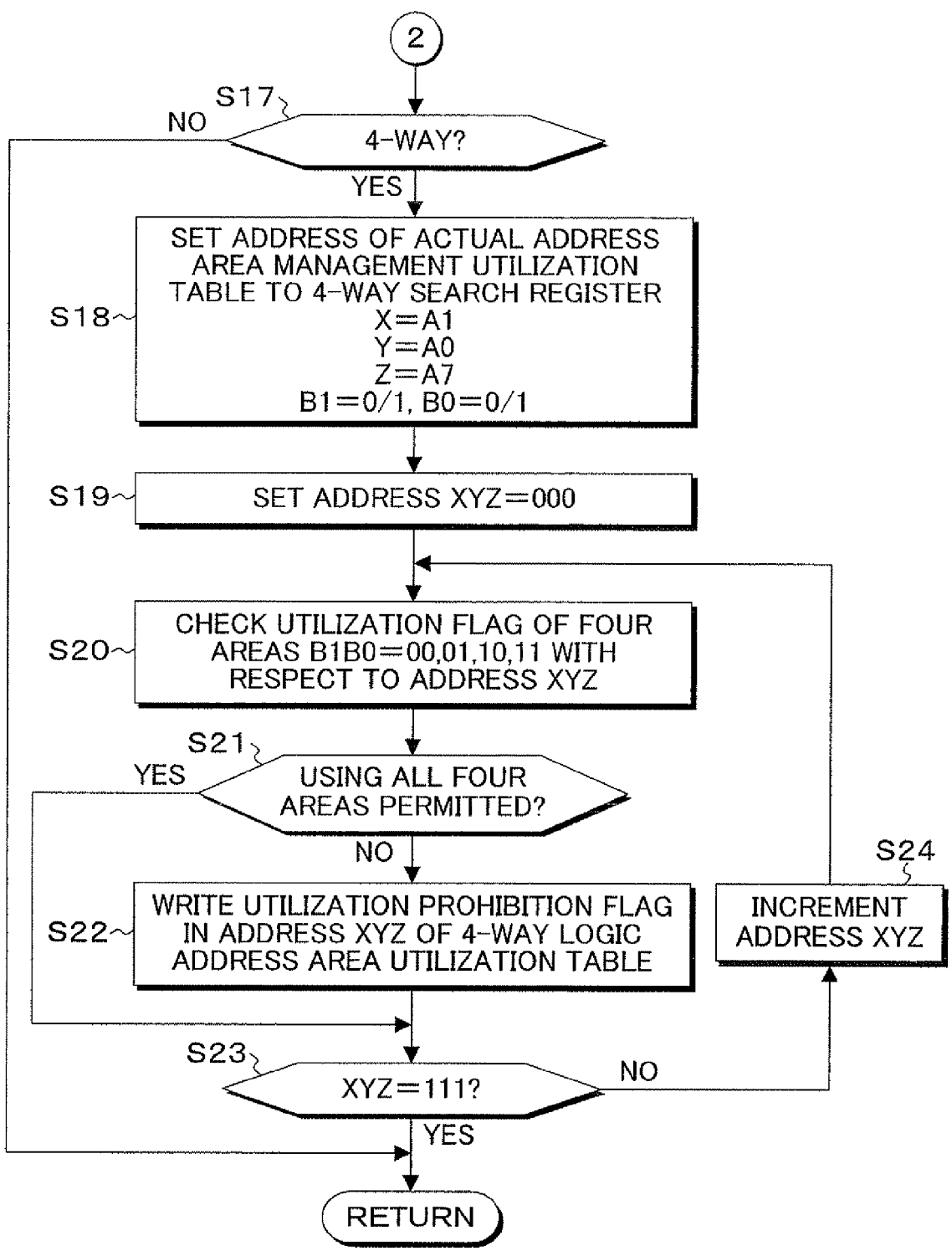
FIG. 26 is a flowchart of the processing for preparing the logic address area utilization table at a time of configuring the 4-way memory from the real address area utilization table corresponding to the 1-way, the 2-way, or the 4-way.

FIG. 26 is a flowchart of the processing for preparing a logic address area utilization table 50-3 at a time of configuring the 4-way from the real address area utilization table 72 in FIGS. 22 and 23. In FIG. 26, at step S17, when the 4-way memory configuration is determined, at step S18, the address of the real address area utilization table 72 is set to the 4-way search register 70-3, and at step S19, after the addresses X, Y, and Z are set to the initial value, at step S20, the utilization flags of the four areas of B1, B0=00, 01, 10, and 11 are investigated with respect to the addresses X, Y, and Z. Subsequently, at step S21, when all the four areas are utilization permitted "◯", step S22 is skipped, and when at least any one of the four areas is utilization prohibited "X", the processing proceeds to step S22, and the utilization flag of the 4-way logic address area utilization table 50-3 in FIG. 23 is written with utilization prohibition "X". This processing from step S20 is repeated until the final addresses are determined at step S23, while incrementing the addresses at step S24. Further, the present invention provides a program executed by the memory controller of the computer system, that is, the memory control device, and this program has the contents shown in the flowcharts in FIGS. 12, 13, 14, 15, 24, 25, and 26.

Further, while the above described embodiment takes as an example the case where the divided number N of the logic address space of the CPU is taken as N=8, and the way number of the interleave control is taken as the 1-way, the 2-way, and the 4-way, the divided number N of the CPU space and the way number W of the interleave control can be optionally set according to need, and preferably, each number is set as a power of two.

Further, while the above described embodiment, for ease of explanation, takes as an example the case where the size per one memory module is taken as 256 bytes, the memory size of this memory module also can take an appropriate value according to need.

Further, while the above described embodiment takes as an example the preparation processing for the logic address area utilization table from the real address area utilization table at a time of activating the computer system and at a time of re-configuring memory, the preparing processing from this real address area utilization table may be performed, in addition to this, at the timing of an appropriate memory configuration such as a time of re-activating accompanied with a power failure and a time of re-configuring due to the system change-over, and moreover, when a new abnormal portion is detected for the memory module.

Particularly, as for the malfunction detection of the memory module, the processing for re-writing as utilization prohibition the permission flag of the corresponding area of the stored real address area utilization table is preferably performed every time the abnormality detection is performed. As a result, a control reflected in the utilization of the memory area at the CPU side which reflects in real time a degenerating condition due to the memory abnormality can be performed.

Further, the present invention includes appropriate modifications not harming its object and advantages, and moreover, is not subject to any restriction by the numerical values shown by the above described embodiments.

The invention claimed is:

1. A memory control method for converting a logical address from a CPU into a real address formed of a memory element selection address and a memory element address to access a plurality of memory elements, comprising:
   converting the logical address of the CPU having a logical address space divided into N areas into a real address with a selector corresponding to a way number W for accessing the plurality of memory elements by an interleave control and for reconfiguring a memory configuration by designation of a different way number W,
   recording, in real address utilization information, utilization prohibition information for an area of the logical address space that includes an abnormal portion, when abnormality of a memory element is detected, wherein the real address area utilization information is recorded with utilizable information for each area of the logical address space by dividing a real address space into areas (N×Wmax) by multiplying an area number N of the logical address space by a maximum way number Wmax of the interleave control, and
   generating logical address area utilization information recorded with the utilizable information or the utilization prohibition information for each area in the logical address space from the real address area utilization information, and
   deciding an area of the logical address space which is utilizable by the CPU.

2. The memory control method according to claim 1, wherein the converting of the logical address of the CPU reconfigures the memory configuration by designation of any of different way numbers W which is a power of two with a selector converting a logical address into the real address.

3. The memory control method according to claim 1, wherein the converting of the logical address of the CPU reconfigures the memory by a designation of a way number 1 or 2 with a selector converting a logical address into the real address,
   wherein the real address area utilization information is recorded with utilizable information or utilization prohibition information for each real address area of the real address space, which is divided by multiplying the area number N of the logical address space by a maximum way number 2 of the interleave control (N×2), by using 4 bits of
   a low order 2 bits of the memory element selection address,
   most significant bit of the real memory element address, and
   least significant bit of the memory element address,
   wherein the generating of the logical address area utilization information in case of a memory configuration where the interleave control is 1-way, prepares a 1-way logical address area utilization information recorded with utilizable information or utilization prohibition information for each logical address area of the logical address space, which is N-divided, by using 3 bits of
   the lower order 2 bits of the memory element selection address, and
   the most significant bit of the memory element address of the real address area utilization information, and
   decides an area of the logical address space which is utilizable by CPU, and
   wherein the generating of the logical address area utilization information, in a case of a memory configuration where the interleave control is 2-way, prepares a 2-way logical address area utilization information recorded with utilization permitting information or utilization prohibition information for each logical address area of the logical address space, which is N-divided, by using 3 bits of
   the low order second bit of the memory element selection address,
   the least significant bit of the memory element address, and
   the most significant bit of the memory element address of the real address area utilization information, and
   decides an area of the logical address space which is utilizable by the CPU.

4. The memory control method according to claim 1, wherein the converting of the logical address of the CPU reconfigures the memory by a designation of a way number 1 or 2 with a selector converting a logical address into the real address,
   wherein the real address area utilization information is recorded with utilizable information or utilization prohibition information for each real address area of the real address space, which is divided by multiplying the area number N of the logical address space by a maximum way number 2 of the interleave control (N×2), by using 4 bits of low order 2 bits of the memory element selection address, most significant bit of the memory element address, and least significant bit of the memory element address.

5. The memory control method according to claim 1, wherein the converting of the logical address of the CPU reconfigures the memory by designation of a way number 1 or 2 with a selector converting a logical address into the real address, wherein the generating of the logical address area utilization information, in case of a memory configuration where the interleave control is 1-way, prepares a 1-way logical address area utilization information recorded with utilizable information or utilization prohibition information for each logical address area of the logical address space, which is N-divided, by using 3 bits of low order 2 bits of the memory element selection address, and least significant bit of the memory element address of the real address area utilization information, and decides an area of the logical address space which is utilizable by the CPU.

6. The memory control method according to claim 1, wherein converting of the logical address of the CPU reconfigures the memory by a designation of a way number 1 or 2 with a selector converting a logical address into the real address, wherein the generating of the logical address area utilization information, in case of a memory configuration where the interleave control is 2-way, prepares a 2-way logical address area utilization information recorded with utilizable information or utilization prohibition information for each logical address area of the logical address space, which is N-divided, by using 3 bits of low order second bit of the memory element selection address, least significant bit of the memory element address, and most significant bit of the memory element address of the real area utilization-information, and decides an area of the logical address space which is utilizable by the CPU.

7. The memory control method according to claim 1, wherein the converting of the logical address of the CPU reconfigures the memory by a designation of a way number 1, 2 or 4 with a selector converting a logical address into the real address, wherein the real address area utilization information is recorded with utilizable information or utilization information for each real address area of the real address space, which is divided by multiplying the area number N of the logical address space by a maximum way number 4 of the interleave control (N×4), by using 5 bits of low order 2 bits of the memory element selection address, most significant bit of the memory element address, and low order 2 bits of the memory element address, wherein the generating of the logical address area utilization information, in the-case of a memory configuration where the interleave control 1-way, prepares a 1-way logic address area utilization information recorded with utilizable information or utilization prohibition information for each logical address area of the logical address space, which is N-divided, by using 3 bits of the low order 2 bits of the memory element selection address, and the least significant bit of the real memory element address of the real address area utilization information, and decides an area of the logic address space which is utilizable by the CPU, wherein the generating of the logical address area utilization information, in the-case of a memory configuration where the interleave control 2-way, prepares a 2-way logical address area utilization information recorded with utilization permitting information or utilization prohibition information for each logical address area of the logical address space, which is N-divided, by using 3 bits of the low order second bit of the memory element selection address, the least significant bit of the real memory element address, and the most significant bit of the memory element address of the real address area utilization information, and decides an area of the logical address space which is utilizable by the CPU, and wherein the generating of the logical address area utilization information, in the-case of a memory configuration where the interleave control tis 4-way, prepares a 4-way logical address area utilization information recorded with utilizable information or utilization prohibition information for each logical address area of the logical address space, which is N-divided, by using 3 bits of the low order 2 bits of the memory element address and the most significant bit of the memory element address of the real address area utilization information, and decides an area of the logical address space which is utilizable by the CPU.

8. The memory control method according to claim 1, wherein the converting of the logical address of the CPU reconfigures the memory by a designation of a way number 1, 2 or 4 with a selector converting a logical address into the real address, wherein the real address area utilization information is recorded with utilizable information or utilization prohibition information for each real address area of the real address space, which is divided by multiplying the area number N of the logical address space by a maximum way number 4 of the interleave control (N×4), by using 5 bits of low order 2 bits of the memory element selection address, most significant bit of the memory element address, and low order 2 bits of the real memory element address.

9. The memory control method according to claim 1, wherein the converting of the logical address of the CPU reconfigures the memory by a designation of a way number 1, 2 or 4 with a selector converting a logical address into the real address, wherein the generating of the logical address area utilization information, in case of a memory configuration where the interleave control is 1-way, prepares a 1-way logical address area utilization information recorded with utilizable information or utilization prohibition information for each logical address area of the logical address space, which is N-divided, by 3 using bits of low order 2 bits of the memory element selection address and least significant bit of the memory element address of the real address area utilization information, and decides an area of the logic address space which is utilizable by the CPU.

10. The memory control method according to claim 1, wherein the converting of the logical address of the CPU reconfigures the memory by a designation of a way number 1,2 or 4 with a selector converting a logical address into the real address, wherein the generating of the logical address area utilization information, in the-case of a memory configuration where the interleave control is 2-way, prepares a 2-way logical address area utilization information recorded with utilizable or utilization prohibition information for each logical address area of the logical address space, which is N-divided, by using 3 bits of low order second bit of the memory element selection address, least significant bit of the real memory element address, and most significant bit of the memory element address of the real address area utilization information, and decides an area of the logical address space which is utilizable by the CPU.

11. The memory control method according to claim 1, wherein the converting of the logical address of the CPU reconfigures the memory by a designation of a way number 1,2 or 4 with a selector converting a logical address into the real address, wherein the generating of the logical address area utilization information, in the-case of a memory configuration where the interleave control is 4-way, prepares 4-way logic address area utilization information recorded with utilizable information or utilization prohibition information for each logical address area of the logical address space, which is N-divided, by using 3 bits of low order 2 bits of the memory element address and most significant bit of the memory element address of the real address area utilization information, and decides an area of the logical address space which is utilizable by the CPU.

12. A non-transitory computer-readable medium encoded with a memory control program to allow a memory control device to convert a logical address from a CPU into a real address formed of a memory element selection address and a memory element address, to access a plurality of memory elements by:

converting the logical address of the CPU utilizing the logical address space divided into N areas into a real address with a selector corresponding to a way number W for accessing the plurality of memory elements by the interleave control and for reconfiguring the memory configuration by the designation of a different way number W;

recording, in real address utilization information, utilization prohibition information for an area of the logical address space that includes an abnormal portion, when abnormality of a memory element is detected, wherein the real address area utilization information is recorded with utilization information for each area of the logical address space by dividing a real address space into areas (N×Wmax) by multiplying an area number N of the logical address space by a maximum way number Wmax of the interleave control, and generating logical address area utilization information recorded with the utilizable information or the utilization prohibition information for each area in the logical address space from the real address area utilization table information and deciding an area of the logical address space which is utilizable by the CPU.

13. A memory control device to convert a logical address from a CPU into a real address formed of a memory element selection address and a memory element address to access a plurality of memory elements, comprising:

an interleave control unit to convert the logical address of the CPU having a logical address space divided into N areas into a real address with a selector corresponding to a way number W for accessing the plurality of memory elements by an interleave control and for reconfiguring a memory configuration by designation of a different way number W;

a real address area management unit to record, in real address utilization information, utilization prohibition information for an area of the logical address space that includes an abnormal portion, when abnormality of a memory element is detected, wherein the real address area utilization information is recorded with utilizable information for each area of the logical address space by dividing a real address space into areas (N×Wmax) by multiplying an area number N of the logical address space by a maximum way number Wmax of the interleave control, and a logical address area management unit to generate logical address area utilization information recorded with the utilizable information or the utilization prohibition information for each area in the logical address space from the real address area utilization information and deciding an area of the logical address space utilizable by the CPU.

14. The memory control device according to claim 13, wherein the converting of the logical address of the CPU reconfigures the memory by a designation of a way number 1 or 2 with a selector converting a logical address into the real address, wherein the real address area management unit generates the real address area utilization information that is recorded with utilizable information or utilization prohibition information for each real address area of the real address space, which is divided by multiplying the area number N of the logical address space by a maximum way number 2 of the interleave control (N×2), by using 4 bits of low order 2 bits of the memory element selection address, most significant bit of the memory element address, and least significant bit of the memory element address, wherein the logical address area management unit, in the-case of a memory configuration where the interleave control is 1-way, prepares a 1-way logical address area utilization table information recorded with utilizable information or utilization prohibition information for each logical address area of the logical address space, which is N-divided by using 3 bits of the low order 2 bits of the memory element selection address, and the least significant bit of the real memory element address of the real address area utilization information, and decides an area of the logic address space utilized by the CPU, and wherein the logical address area management step-unit, in the-case of a memory configuration where the interleave control is 2-way, prepares a 2-way logical address area utilization information recorded with utilizable information or utilization prohibition information for each logical address area, which is N-divided, by using 3 bits of the low order second bit of the memory element section address, the least significant bit of the real memory element address, and the most significant bit of the memory element address of the real address area utilization information, and decides an area of the logical address space which is utilizable by the CPU.

15. The memory control device according to claim 13, wherein the converting of the logical address of the CPU reconfigures the memory by a designation of a way number 1,2 or 4 with a selector converting a logical address into the real address, wherein the real address area management unit generates the real address area utilization information that is recorded with utilizable information or utilization prohibition information for each real address area of the real address space, which is divided by multiplying the area number N of the logical address space by a maximum way number 4 of the interleave control (N×4), by using 5 bits of low order 2 bits of the memory element selection address, most significant bit of the memory element address, and lower 2 bits of the memory element address, wherein the logical address area management step-unit, in the-case of a memory configuration where the interleave control 1-way, prepares a 1-way logical address area utilization information recorded with utilizable information or utilization prohibition information for each logical address area of the logical address space, which is N-divided, by using 3 bits of the low order 2 bits of the memory element selection address, and the least significant bit of the real memory element address of the real address area utilization information, and decides an area of the logical address space which is utilizable by the CPU, wherein the logical address area management step-unit, in the-case of a memory configuration where the interleave control is 2-way, prepares a 2-way logical address area utilization information recorded with utilizable information or utilization prohibition information for each logical address area of the logical address space, which is N-divided, by using 3 bits of the low order 2 bit of the memory element section address, the least significant bit of the real memory element address, and the most significant bit of the-reel memory element address of the real address area utilization information, and decides an area of the logical address space which is utilizable by the CPU, and wherein the logical address area management step-unit, in the-case of a memory configuration wherein the interleave control is 4-way, prepares a 4-way logical address area utilization information recorded with utilizable information or utilization prohibition information for each logical address area of the logical address space, which is N-divided, by using 3 bits of the low order 2 bit of the real memory element address and the most significant bit of the real memory element address of the real address area utilization information, and decides an area of the logical address space which is utilizable by the CPU.

16. The memory control device according to claim 13, wherein the converting of the logical address of the CPU reconfigures the memory configuration by designation of any of different way numbers W which is a power of two with a selector converting a logical address into the real address.

* * * * *

UNITED STATES PATENT AND TRADEMARK OFFICE
CERTIFICATE OF CORRECTION

| | |
|---|---|
| PATENT NO. | : 8,219,881 B2 |
| APPLICATION NO. | : 12/052846 |
| DATED | : July 10, 2012 |
| INVENTOR(S) | : Kosaku Nakada |

It is certified that error appears in the above-identified patent and that said Letters Patent is hereby corrected as shown below:

Column 18, Line 30, In Claim 3, after "bit of the" delete "real".
Column 18, Line 34, In Claim 3, delete "information" and insert -- information, --, therefor.
Column 19, Line 44, In Claim 6, delete "utilization-information," and insert -- utilization information, --, therefor.
Column 19, Line 53, In Claim 7, after "utilization" insert -- prohibition --.
Column 19, Line 62, In Claim 7, delete "the-case" and insert -- case --, therefor.
Column 19, Line 63, In Claim 7, after "control" insert -- is --.
Column 20, Line 3, In Claim 7, after "bit of the" delete "real".
Column 20, Line 8, In Claim 7, delete "the-case" and insert -- case --, therefor.
Column 20, Line 9, In Claim 7, after "control" insert -- is --.
Column 20, Line 17, In Claim 7, after "bit of the" delete "real".
Column 20, Line 23, In Claim 7, delete "the-case" and insert -- case --, therefor.
Column 20, Line 25, In Claim 7, delete "tis" and insert -- is --, therefor.
Column 20, Line 30, In Claim 7, after "address" insert -- , --.
Column 20, Line 49, In Claim 8, after "bits of the" delete "real".
Column 20, Line 61, In Claim 9, delete "by 3 using bits" and insert -- by using 3 bits --, therefor.
Column 20, Line 62, In Claim 9, after "address" insert -- , --.
Column 21, Line 4, In Claim 10, delete "1,2" and insert -- 1, 2 --, therefor.
Column 21, Line 7, In Claim 10, delete "the-case" and insert -- case --, therefor.
Column 21, Line 16, In Claim 10, after "bit of the" delete "real".
Column 21, Line 28, In Claim 11, delete "the-case" and insert -- case --, therefor.
Column 21, Line 29, In Claim 11, after "prepares" insert -- a --.
Column 21, Line 34, In Claim 11, after "address" insert -- , --.
Column 21, Line 45, In Claim 12, delete "the" and insert -- a --, therefor.
Column 21, Line 48, In Claim 12, delete "the" and insert -- an --, therefor.
Column 21, Line 50, In Claim 12, after "configuration by" delete "the".
Column 21, Line 65, In Claim 12, after "utilization" delete "table".
Column 21, Line 66, In Claim 12, after "information" insert -- , --.
Column 22, Lines 46-47, In Claim 14, delete "the-case" and insert -- case --, therefor.

Signed and Sealed this
Second Day of October, 2012

David J. Kappos
*Director of the United States Patent and Trademark Office*

CERTIFICATE OF CORRECTION (continued)

U.S. Pat. No. 8,219,881 B2

Column 22, Line 49, In Claim 14, after "utilization" delete "table".
Column 22, Line 55, In Claim 14, after "bit of the" delete "real".
Column 22, Line 59, In Claim 14, delete "step-unit," and insert -- unit, --, therefor.
Column 22, Line 60, In Claim 14, delete "the-case" and insert -- case --, therefor.
Column 22, Line 66, In Claim 14, delete "section" and insert -- selection --, therefor.
Column 23, Line 1, In Claim 14, after "bit of the" delete "real".
Column 23, Line 10 (Approx.), In Claim 15, delete "1,2" and insert -- 1, 2 --, therefor.
Column 23, Line 24 (Approx.), In Claim 15, delete "step-unit," and insert -- unit, --, therefor.
Column 23, Line 25 (Approx.), In Claim 15, delete "the-case" and insert -- case --, therefor.
Column 23, Line 26 (Approx.), In Claim 15, after "control" insert -- is --.
Column 23, Line 33 (Approx.), In Claim 15, after "bit of the" delete "real".
Column 24, Line 3, In Claim 15, delete "step-unit," and insert -- unit, --, therefor.
Column 24, Line 4, In Claim 15, delete "the-case" and insert -- case --, therefor.
Column 24, Line 10 (Approx.), In Claim 15, delete "section" and insert -- selection --, therefor.
Column 24, Line 11 (Approx.), In Claim 15, after "bit of the" delete "real".
Column 24, Line 13 (Approx.), In Claim 15, delete "the-reel" and insert -- the --, therefor.
Column 24, Line 16 (Approx.), In Claim 15, delete "step-unit," and insert -- unit, --, therefor.
Column 24, Line 17 (Approx.), In Claim 15, delete "the-case" and insert -- case --, therefor.
Column 24, Line 23, In Claim 15, after "bit of the" delete "real".
Column 24, Line 23, In Claim 15, after "address" insert -- , --.
Column 24, Line 24, In Claim 15, after "bit of the" delete "real".